US006144380A

United States Patent [19]

Shwarts et al.

[11] Patent Number: 6,144,380

[45] Date of Patent: Nov. 7, 2000

[54] METHOD OF ENTERING AND USING HANDWRITING TO IDENTIFY LOCATIONS WITHIN AN ELECTRONIC BOOK

[75] Inventors: Scott L. Shwarts, Scottsdale, Ariz.; David R. Dunham, Seattle, Wash.

[73] Assignee: Apple Computer Inc., Cupertino, Calif.

[21] Appl. No.: 08/801,251

[22] Filed: Feb. 19, 1997

Related U.S. Application Data

[60] Continuation of application No. 08/454,061, May 30, 1995, abandoned, which is a division of application No. 08/147, 143, Nov. 3, 1993.

[51] Int. Cl.[7] .............................. G06F 3/00; G06F 17/21; G06K 9/00

[52] U.S. Cl. .......................... 345/350; 345/358; 345/357; 345/179; 382/187; 707/512; 707/541

[58] Field of Search .................................... 345/350, 349, 345/351, 358, 357, 975, 356, 326, 179, 156, 130; 707/507, 512, 541, 501; 382/187, 186, 189

[56] References Cited

U.S. PATENT DOCUMENTS

| | | | |
|---|---|---|---|
| 4,972,496 | 11/1990 | Sklarew | 382/187 |
| 5,063,600 | 11/1991 | Norwood | 382/186 |
| 5,148,155 | 9/1992 | Martin et al. | 345/179 X |
| 5,157,783 | 10/1992 | Anderson et al. | 395/145 X |
| 5,199,104 | 3/1993 | Hirayama | 395/145 |
| 5,237,651 | 8/1993 | Randall | 395/155 X |
| 5,276,794 | 1/1994 | Lamb, Jr. | 395/149 |
| 5,283,864 | 2/1994 | Knowlton | 395/161 X |
| 5,341,293 | 8/1994 | Vertelney et al. | 395/159 X |
| 5,347,295 | 9/1994 | Agulnick et al. | 345/156 |
| 5,367,453 | 11/1994 | Capps et al. | 395/155 X |
| 5,377,281 | 12/1994 | Ballard et al. | 382/229 |
| 5,390,281 | 2/1995 | Luciw et al. | 364/419.08 X |
| 5,392,387 | 2/1995 | Fitzpatrick et al. | 395/159 X |
| 5,398,310 | 3/1995 | Tchao et al. | 395/144 |
| 5,404,442 | 4/1995 | Foster et al. | 395/146 X |
| 5,416,895 | 5/1995 | Anderson et al. | 395/155 X |
| 5,455,901 | 10/1995 | Friend et al. | 395/149 |
| 5,500,929 | 3/1996 | Dickinson | 395/160 |
| 5,515,497 | 5/1996 | Itri et al. | 395/159 |

OTHER PUBLICATIONS

O'Connor, Rory J., "Apple Banking on Newton's Brain", Apr. 22, 1992, San Jose Mercury News.

Weiman, Liza and Moran, Tom, "A Step Toward the Future", Aug. 1992, Macworld Magazine.

Soviero, Marcelle M., "Your World According to Newton", Sep. 1992, Popular Science Magazine.

Abatemarco, Fred, "From the Editor", Sep. 1992, Popular Science Magazine.

PenBook by Slate Corporation brochure, approx. 1991.

Nordgren, Loyne, "The New Grolier Multimedia Encyclopedia," CD–ROM Professional, V6, n3, p133–134, May 1993.

Screen Dumps from Microsoft ® Windows ® Help, Microsoft Corporation, 1985–1992, pp. 1–7.

*Primary Examiner*—Raymond J. Bayerl

*Attorney, Agent, or Firm*—Beyer Weaver & Thomas LLP

[57] ABSTRACT

A method for controlling a screen display of an electronic book. The contents of the book are displayed on a screen of the computer system as pages with which the user interacts by a pointer such as a pen or stylus. The content engine performs various functions including one or more of the following: (1) creating page displays for content of the book, (2) providing a navigation interface for identifying material in the book and moving to desired locations, (3) finding character strings located within the book, and (4) accepting handwritten information on pages of the book. The electronic book includes a "bookmark" button which when selected displays a bookmark icon and inserts a bookmark in the book at the page that is currently displayed. Thereafter the user can close the book or move to another page and automatically return to the marked page by selecting the bookmark icon. The user can also move to other pages by scrolling with scroll keys or other navigational devices such as tables of contents browsers and menu pages which are provided on the computer system.

4 Claims, 28 Drawing Sheets

186 188

| | | | |
|---|---|---|---|
| pg. 5 | B1 | [0,3,240,120] | [C36] |
| | B2 | [ ... ] | [C37] |
| | B3 | [ ... ] | [C38] |

| | | | |
|---|---|---|---|
| C36 := | Text: | "Text Stream Here..." | 161 |
| | Styles: | [15,51,10,52,11,57...] | 163 |
| | Tabs: | ... | |
| | Layout: | Centered, Borders, ... | 167 |
| | Script: | {Script associated with Text} | 165 |
| | Color: | Blue | |
| | Phone: | 411 | |

Fig. 9b

| | | | |
|---|---|---|---|
| C37 := | Icon: | [Instructions for Graphic] | 169 |
| | Layout: | Side-by-Side | 171 |
| | Script: | {Script associated with Graphic} | 173 |
| | Food: | Sushi | |
| | City: | Scottsdale | |

Fig. 9c

Fig. 18
Newton 800#'s
Domestic Air Carriers
International Air Carriers
Auto Rental Agencies
Hotels, Motels Inns
Express Mail Package Service
Flowers, Gourmet Food & Gifts
2

METHOD OF ENTERING AND USING HANDWRITING TO IDENTIFY LOCATIONS WITHIN AN ELECTRONIC BOOK

This is a continuation of application Ser. No. 08/454,061 filed May 30, 1995, now abandoned, which is a division of application Ser. No. 08/147,143 filed Nov. 3, 1993.

BACKGROUND OF THE INVENTION

The present invention relates generally to methods and apparatus for interactively displaying book-like documents on pointer-based computer systems such as pen-based computers. The book-like documents may have one or more tools for navigating through their contents quickly. The contents of such documents may include text, graphics, "live" action templates, etc.

A pen-based computer is a small, often hand-held, computer system where the primary method for inputting data includes a "pen" or stylus. A typical pen-based computer system is housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of the stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computers as a computerized notepads. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion.

Such computer systems have many uses: they can be used to jot down notes at meetings, organize to-do lists, send and receive information by faxing, electronic mail, etc. Because computer systems such as these are an integral part of many user's lives, it would also be desirable if they could be used to store and display book-like information such as novels and reference materials (i.e., electronic books). This would be especially desirable in pen-based computer systems which recognize handwritten instructions and allow the user to scribble handwritten notes and interact with "live" screens which might be incorporated into the books.

Suitable materials for use as "electronic books" might include interactive almanacs, encyclopedias, and other reference materials such as lists of phone numbers for various consumer services or government agencies. Unfortunately, books and reference materials such as these can become large and unwieldy, especially without careful organization. Thus, it would be useful to have specialized tools for navigating throughout the content of an electronic book. "Find" methods are now available for searching all text content within a document to locate specific character strings, but these methods are often too slow or unfocused to quickly take the user to a desired location. It would therefore be desirable to include in electronic books one or more high-level navigation systems that quickly show the user where he or she is located within the book, what other material is available in the book, and how to get to other locations in the book.

SUMMARY OF THE INVENTION

The present invention provides a method and "content engine" for controlling a screen display of an electronic book. The contents of the book are displayed on a screen of the computer system as "pages" with which the user interacts by a pointer such as a pen or stylus. The content engine performs various function which may include one or more of the following: (1) creating page displays for content of a "book," (2) providing a consistent navigation interface for quickly identifying material in the book and moving to desired locations, (3) finding character strings located within the "book," and (4) accepting handwritten information on pages of the book. These functions can be accessed by selecting specified buttons, slide bars, menu items, etc. which may appear on the screen continuously or in response to specific user events. In a preferred embodiment, the content engine displays one or more pointer-activated buttons on a "status bar" displayed on the screen. Content or books that might be utilized according to this invention includes interactive novels, reference books, encyclopedias, etc.

In a preferred embodiment, the content engine causes a navigation dialog box to appear on the screen in response to a prompt with the pointer. The navigation dialog box includes a "bookmark" button which when selected inserts a bookmark in the book at the page that is currently displayed. A bookmark in the context of this invention acts much like a bookmark in a conventional book; it marks a page of the book so that the user can easily return to that page after closing the book or moving to another page. In the case of an electronic book, the user can close the book by, for example, selecting a close button or turning off power to the machine. The user can also move to other pages by scrolling with scroll keys or other navigational devices which are provided on the computer system. Once a bookmark is created (by selecting the bookmark button from the navigation dialog box), that bookmark is represented by an icon displayed on the screen within the navigation dialog box. In some embodiments, the bookmark will be represented as a miniature image of the page which has been marked. When the user selects the bookmark from the dialog box, the content engine will automatically move to and display the marked page, regardless of which page is currently "open."

The navigation dialog box may include buttons for other navigational tools such as a "return to menu" function and a "return to previous page" function. The menus referred to here are menu or "kiosk" pages that include menus of destinations within the book. If the reader is lost, he or she can jump to the nearest prior menu page by selecting the return to menu button from the navigation dialog box. The system will then automatically move to the first menu page preceding the currently displayed page. Selecting the "return to previous page" button causes the page displayed immediately prior to current page to be redisplayed, regardless of where it is located with respect to the current page.

In another aspect, the present invention provides a table of contents or browser displayed on the screen. The browser lists "subjects" within the book in order in which they appear in the book. The user can scroll from subject to subject in the browser by selecting up or down scroll arrows provided on the computer system. This causes two changes: (1) the page currently displayed is changed to the first available page within the newly selected subject, and (2) a "you are here" indicator on the browser moves so that it points to the new subject. The user can also move to the first available page within a subject by selecting that subject on the screen (by, e.g., tapping on that subject with a stylus).

The navigation tools at the disposal of the user of this invention collectively provide quick, easy methods for showing the user where he or she is located within the book, what other material is available in the book, and how to get to other locations in the book. In addition, many of these navigation tools allow "live" interaction with the user. "Live" refers to the interaction capabilities of displayed features such as buttons, dialog boxes, etc., such that a user can select certain of these items to take further action (e.g., getting more information about the item or moving to a location). The wide variety of flexible tools for moving about within a document is a particular advantage of this invention.

In addition to the above-described navigational tools, the present invention provides an efficient method for searching or "finding" character strings within a document. Preferably, this is accomplished by first displaying a dialog box having a find field. Handwritten information written within the find field is then recognized as a character string. Of course, other methods of entering a searchable character string may also be employed such as selecting text that already exists in a document. Regardless of how the character string is entered, the system encodes it as a collection of trigrams. A trigram is numerical value obtained by combining unique numerical values for each of three consecutive letters in a character string. The number of trigrams encoded in a character string is equal to the number of characters in the string minus 2. Some units of text content within the book will have premade trigrams for all the information they contain. During a search for the character string, its trigrams are compared against those of potentially searchable text units. If the text unit does not have trigrams corresponding to each of the search string's trigrams, it is concluded that the text unit can not contain the search string. Such text units are then ignored. If on the other hand, the text unit does contain each trigram of the text string, the unit may contain the search string and a full text search is conducted. In this manner, the system avoids much needless full-text searching of contents that cannot contain the search string and thereby provides a more efficient search routine.

In yet another aspect, the present invention provides methods of inputting and displaying handwritten material on pages of the book. For example, the user can jot personal notes on the pages of the book. In preferred embodiments, such notes can be entered and displayed when a "mark-up" button is selected from the computer system. Further, the notes can be "erased" (i.e., permanently removed from the display) by various methods.

These and other features of the present invention will be presented in more detail in the following specification of the invention and the several figures.

BRIEF DESCRIPTION OF THE DRAWINGS

FIGS. 9*a–c* are illustrations of a page description and content records used by a computer system of this invention to create a page display;

DETAILED DESCRIPTION OF THE PREFERRED EMBODIMENTS

The present invention is well suited for pointer based computer systems such as the pen-based, pen-aware and mouse controlled systems that are currently popular. For the purposes of illustration, the invention will be described in connection with a pen-based system.

Figure 1:
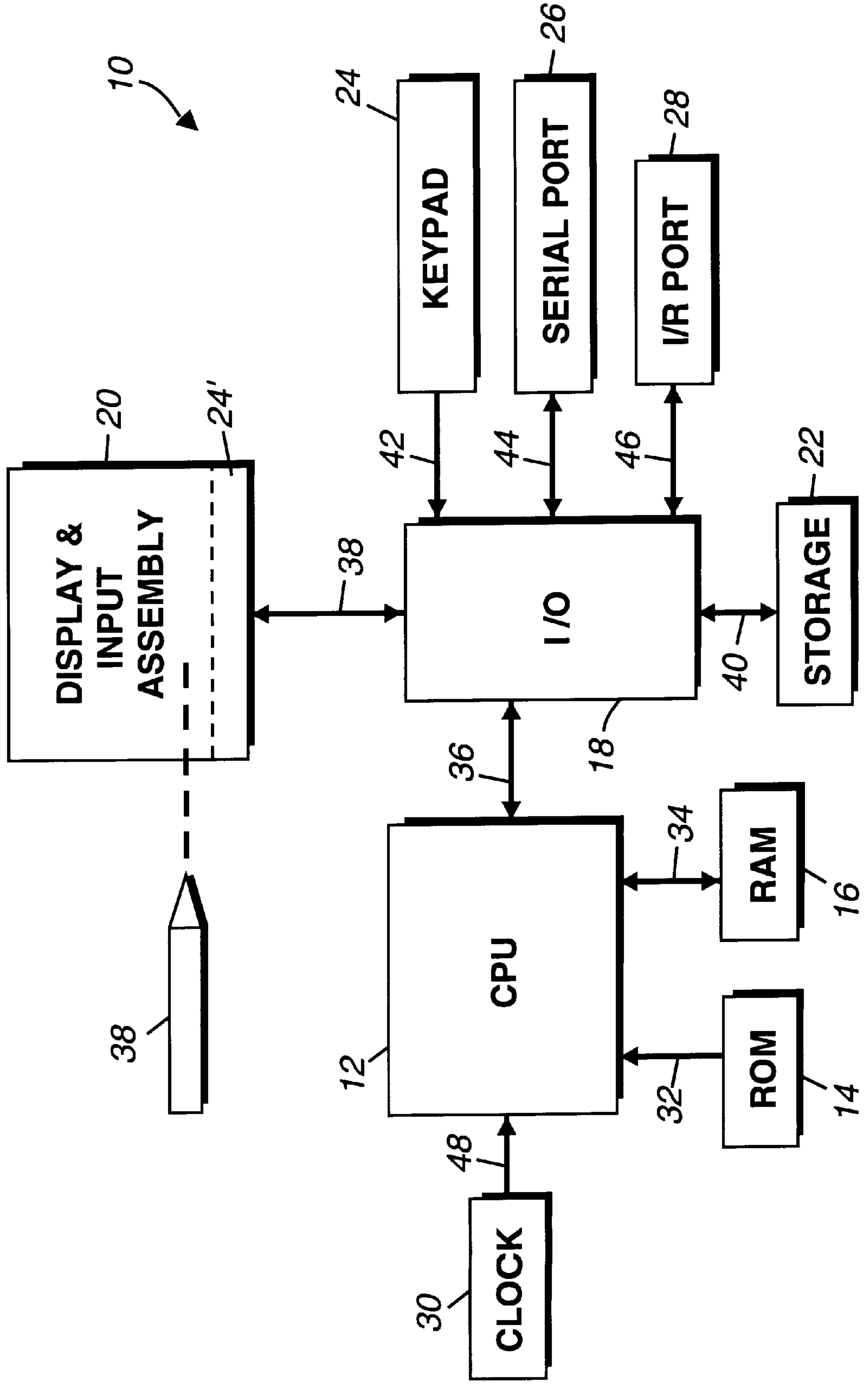
FIG. 1 is a block diagram of a pen-based computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 preferably contains the basic operating system for the pen-based computer system 10. CPU 12 is connected to RAM 16 by a bi-directional data bus 34 to permit the use of RAM 16 as scratch pa d memory. ROM 14 and RAM 16 are also coupled to CPU 12 by appropriate control and address busses, as is well known to those skilled in the art. CPU 12 is coupled to the I/O circuitry 18 by bi-directional data bus 36 to permit data transfers with peripheral devices.

I/O circuitry 18 preferably includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and I/R port 28.

Display assembly 20 of pen-based computer system 10 is both an input and an output device. Accordingly, it is coupled to I/O circuitry 18 by a bi-directional data bus 37. When operating as an output device, the display assembly 20 receives data from I/O circuitry 18 via bus 37 and displays that data on a suitable screen. The screen for display assembly 20 is preferably a liquid crystal display (LCD) of the type commercially available from a variety of vendors. The input device of display assembly 20 is preferably a thin, clear membrane which covers the LCD display and which is sensitive to the position of a stylus 38 on its surface. With such a structure, the membrane of the display assembly 20 can serve as an input "tablet." These position sensitive membranes are also commercially available. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

Figure 2:
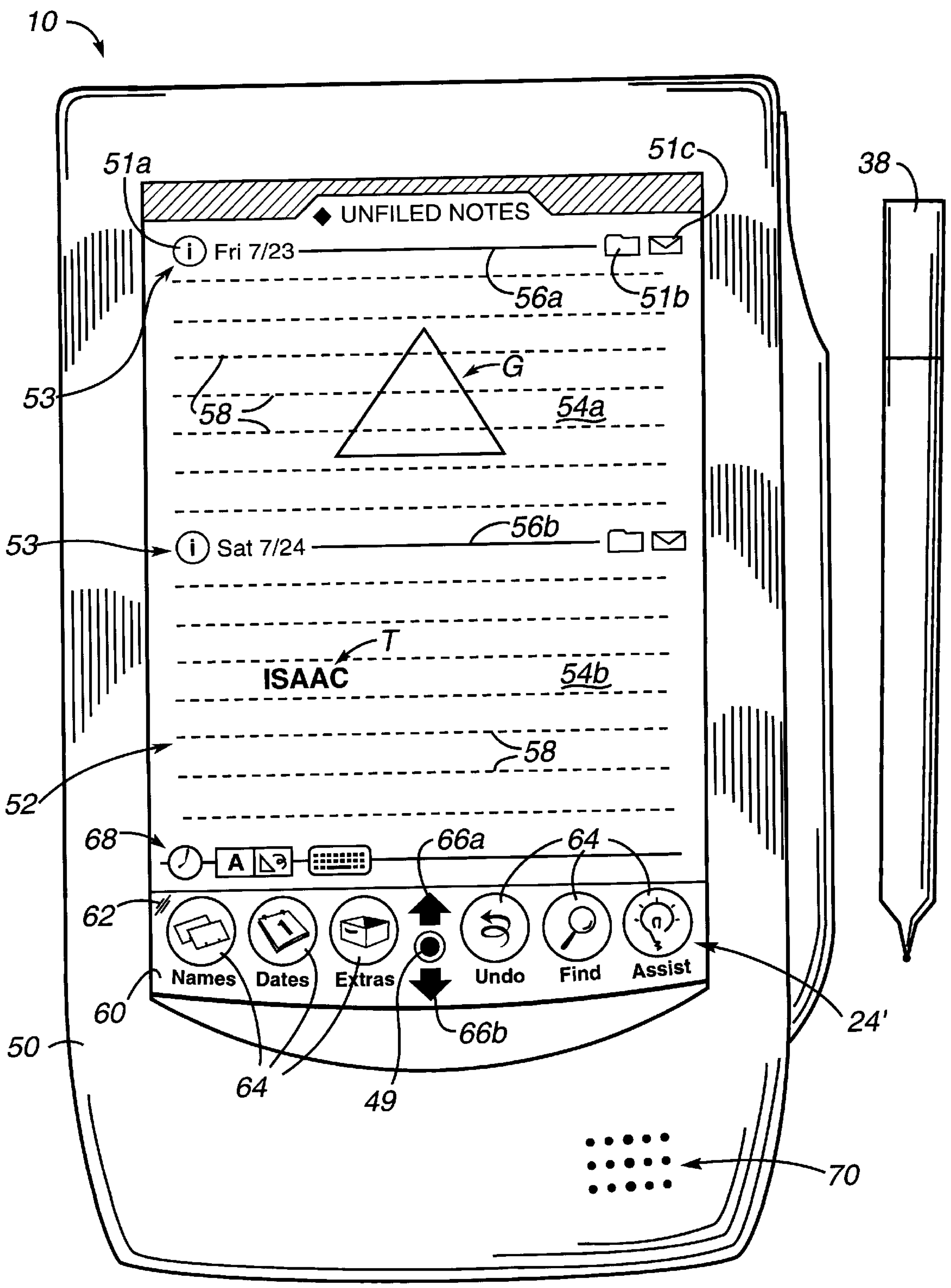
FIG. 2 is a pictorial representation of the screen of a computer display assembly of the present invention.

The keypad 24' can comprise an array of mechanical buttons or switches coupled to I/O circuitry 18 by a data bus 42. Alternatively, keypad 24' can comprise an entire, standard QWERTY keyboard. In the present embodiment, a separate keypad 24' is not used in favor of a "pseudo" keypad 24'. This "pseudo" keypad 24' comprises "button" areas which are associated with a bottom edge of the tablet membrane that extends beyond the lower edge of the LCD display. These button areas are defined by a printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 37 and I/O 18. An example of pseudo keypad 24' is shown in FIG. 2.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Serial port 26 is coupled to I/O circuitry by a bi-directional bus 44. The serial port 26 can be used to couple the CPU to external devices and networks.

Infrared (I/R) port 28 is coupled to I/O circuitry by a bi-directional bus 46. The I/R port can be used for outgoing information (e.g. to control a printer or some other external device, or to communicate with other computer systems) or for incoming information from other computers or devices.

Clock 30 preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 37 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 37 to produce appropriate images on the screen portion of the display assembly 20.

In FIG. 2, the pen-based computer system 10 of FIG. 1 is shown housed within a generally rectangular enclosure 50. The CPU 12, ROM 14, RAM 16, I/O circuitry 18, and clock 30 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

The enclosure 50 is preferably provided with apertures 70 which permit the free transmission of sound from a speaker (not shown) which is housed within enclosure 50. The speaker can be driven by the CPU 12, by I/O circuitry 18, or by specialized sound chips, as is well known to those skilled in the art. The speaker can be used to provide user feed-back, or to transmit audible information to a user.

Upon power-up, pen based computer system 10 displays on screen 52 an initial "note" area 54*a* including a header 53 and a number of guidelines 58. The header 53 preferably includes a header bar 56*a*, the date of creation of the note area 54*a*, and one or more icons and "soft" dedicated header function buttons 51A, 51B, and 51C. The optional guidelines 58 aid a user in entering text, graphics, and data into the pen-based computer system 10. A graphic object G in the form of a triangle is shown entered within note area 54*a*.

Additional note areas, such as a note area 54*b*, can be formed by drawing a substantially horizontal line across the screen 52 with the stylus 38. The substantially horizontal line is recognized by the system 10 and is converted into a second header bar 56*b*. Additional text, graphical, and other data can then be entered into this second note area 54*b*. For example, the text object T comprising "ISAAC" has been entered into second note area 54*b*.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a keypad could comprise "soft buttons" i.e. images generated at convenient locations on the screen 52, in which case a "button" would be activated by touching the stylus to the screen over the image of the button. The keypad 24' preferably includes a number of dedicated function buttons 64, an "overview button" 49, and a pair of scroll buttons 66*a* and 66*b*. The function buttons 64 include an address button ("Names"), a calendar button ("dates"), a drawer button ("extras"), an undo button, a find button, and an assist button. The operation of the note areas 54*a*, 54*b*, etc., scroll buttons 66*a* and 66*b*, and other aspects of computer system 10 are discussed in greater detail in U.S. patent application Ser No. 07/868,013, filed Apr. 13, 1992, and U.S. patent application Ser. No. 08/127,211, filed on Sep. 24, 1993 and entitled "Method for Manipulating Notes on a Computer Display," both of which name Tchao et al. as inventors, are assigned to the assignee of the present invention and are incorporated herein by reference in its entirety.

The screen illustrated in FIG. 2 is referred to as the "notepad", and is preferably an application program running under the operating system of the pen based computer system 10. In this preferred embodiment, the notepad is a special or "base" application which is always available beneath higher level applications. The notepad application, like other applications, runs within a window, which in this instance comprises the entire viewing screen 52. Therefore, as used herein, a "window" is the entire screen or any portion of an entire screen which is dedicated to a particular application program or a feature of an application program. When the notepad application is running, the address button (names) can then be used to launch an address book application program. That is, when the address button is depressed, a suitable address book application program is opened and a suitable address book dialog box is displayed on screen 52. Similarly, the calendar button (dates) launches a calendar application program when depressed.

A status bar 68 is provided at the bottom of the notepad application. The status bar 68 may be provided with a number of active and display areas. For example, U.S. patent application Ser. No. 07/976,970 filed Nov. 16, 1992 on behalf of Foster et. al, entitled "Status Bar for Application Windows" and assigned to the assignee of the present invention describes how to make and use the status bar for certain applications (e.g., a notepad application), and is incorporated herein by reference in its entirety.

The "Find" button is used to initiate a search for information. The undo button will undo the latest user action when depressed and will undo the last two actions if depressed a second time without the intervention of any additional user actions. The assist button gives the user access to a help menu which is designed to provide operating instructions to the user that may be helpful when the user is unsure of how to operate the computing system.

Figure 3:
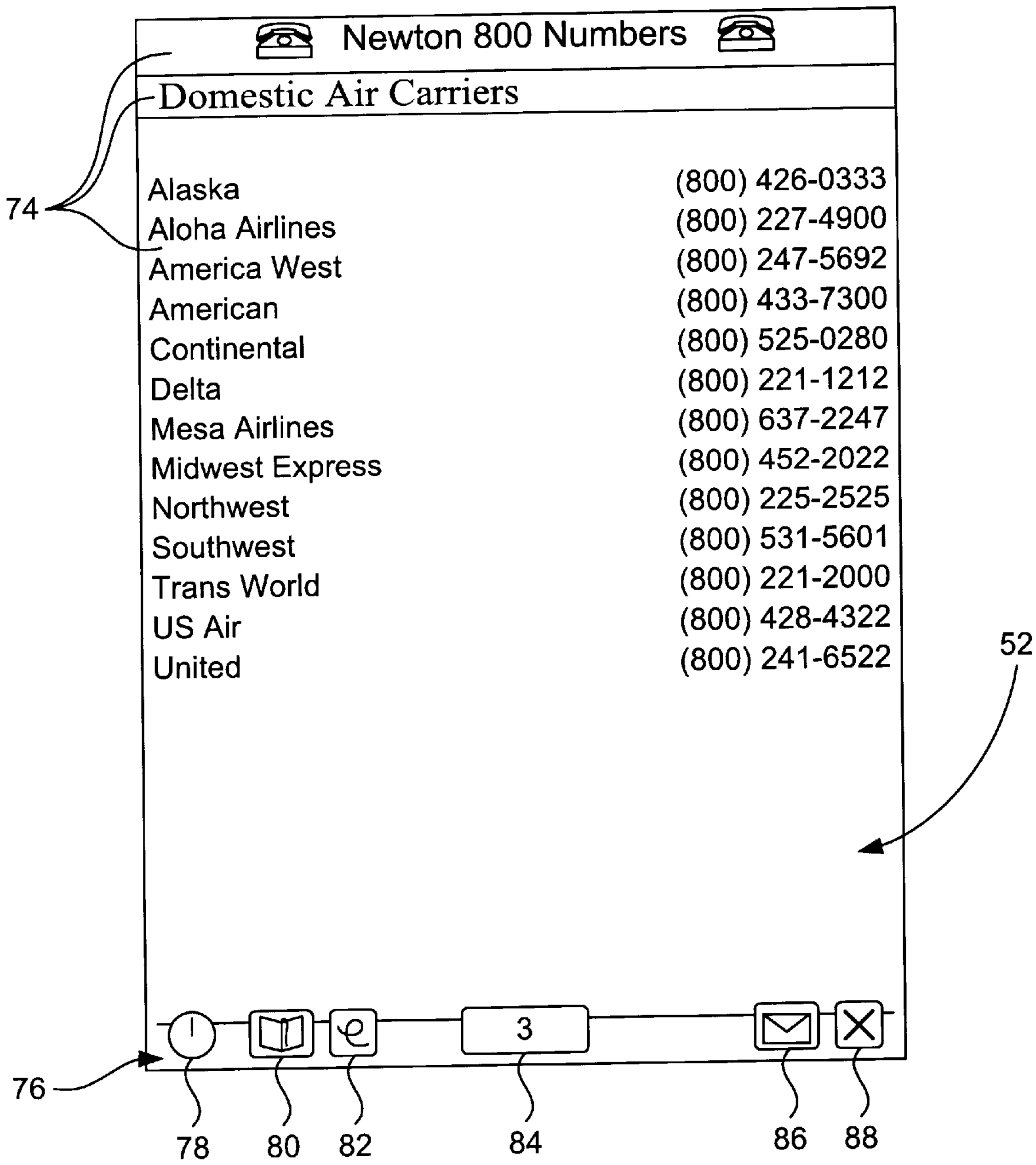
FIG. 3 is a representation of a computer screen displaying a page of an electronic book according to this invention.

A "drawer", which is opened by pressing the drawer button ("extras") is used to store other application programs, tools, access buttons to external ROM cards, communications applications and other items that can be utilized by the user. When the drawer is "opened", a drawer dialog box 55 is displayed on the screen 52 as shown in FIG. 3. The user can then launch any application stored therein merely by tapping on the associated icon that is displayed within the drawer dialog box. Thus, the icons serve as "soft buttons" which may be activated by tapping the screen at a location corresponding to the displayed position of the icon. Of course, in alternative embodiments, the particular applications that are accessed by keypad buttons can be varied widely. For example, additional keys could be added, existing keys removed, and/or the above described keys could be used to launch different applications.

A plurality of application programs (sometimes referred to as packages) may be stored in the system's memory. By way of example, the notepad, a calendar application, an address book application, a to-do list application and a variety of other application programs may be provided. The subject of the present invention, the content engine, may also be stored in the system's memory. The memory may be divided into two or more discrete sections (sometimes referred to as stores herein), which represent separately addressable segments of memory. By way of example, internal RAM that acts as a first portion of memory may be considered one store. A PCMCIA card, which can be a part of mass storage 22, may be considered a second store. Within each store, much of the data may be divided into a plurality of different record files (sometimes called soups herein). The record files each include a number of records that are to be used with one or more of the specific application files. In one suitable embodiment, each page (screen-full) of text constitutes a separate record, with each record being given a record number that is unique within that application file. Thus, for example, within the calendar application file, there may initially be thirty records. These records would be given record numbers zero to twenty-nine, respectively.

Preferred embodiments of the present invention employ various "objects." As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, Object Oriented Programming for the Macintosh, by Kurt J. Smucker, Hayden Book Company, 1986.

In the present invention, objects are preferably implemented as part of a frame system that comprises frame objects related by a semantic network. A description of semantic networks can be found in "A Fundamental Tradeoff in Knowledge Representation and Reasoning", Readings in Knowledge Representation, by Brachman and Leveseque, Morgan Kaufman, San Mateo, 1985.

Another preferred tool for implementing the system of the present invention is a view system. Various types of view systems are well known to those skilled in the art. In the present system, the notepad application on the screen 52 forms a first or "root" layer, with the status bar 68, for example, positioned in a second layer "over" the root layer. The various buttons of the status bar 68 are positioned in a third layer "over" the second and root layers. The view system automatically handles "taps" and other gestures of the stylus 38 on the screen 52 by returning information concerning the tap or gesture and any object to which it may be related. Again, the status bar 68 and the view system is described in greater detail in copending U.S. patent application Ser. No. 07/976,970, which has been incorporated herein by reference. It is therefore clear that the object oriented programming and view system software makes the implementation of the processes of the present invention less cumbersome than traditional programming techniques. However, the processes of the present invention can also be implemented in alternative fashions, as will be well appreciated by those skilled in the art.

A preferred embodiment of this invention will now briefly be described in the context of the figures illustrating various views created on screen 52. The procedure described below is driven by a "content engine" running on CPU 12. Initially, the user selects a book he or she wishes to read by tapping on the "extras" or "drawer" button of keypad 24', an extras window then appears on the screen and lists any books that are installed in memory. After selecting a book to be read, the book is opened to a "current page." That is, a record in the book designated as "current page" is displayed on screen 52. A page of an exemplary book (containing a list of "800" phone numbers) is shown in FIG. 3. The particular page displayed includes the phone numbers of domestic air carriers. The "content" 74 of the displayed page includes the actual list of domestic air carriers and their phone numbers. In addition, the content includes a book title "Newton 800 Numbers" with two graphic representations of a telephone and a heading "Domestic Air Carriers" shown in reversed font style.

Displayed at the bottom of the current page is a status bar 76 associated with the content engine application. In preferred embodiments, the status bar will appear anytime a book is open. As shown, the status bar 76 includes a time button 78 (which when selected shows the date and time), a bookmark button 80, a "mark-up" button 82, a page number button 84, a routing action button 86, and a close button 88. The functions of each of these buttons will be described in more detail below. In addition to the functions provided on status bar 76, the content engine can employ functions that are activated by the scroll buttons 66*a* and 66*b*, the overview button 49, and the various function buttons 64 (e.g., the undo button, the find button, and the assist button).

Figure 13:
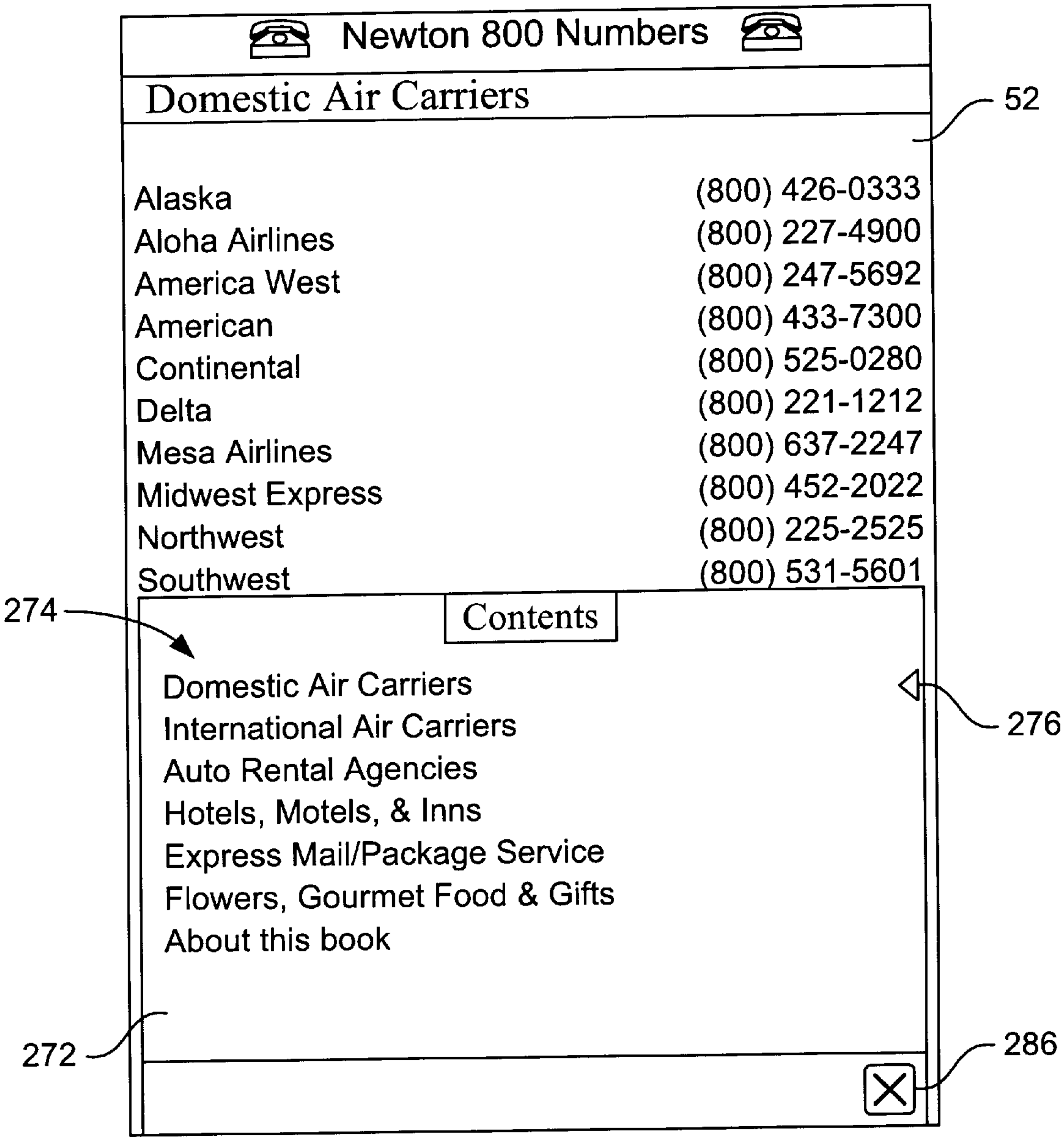
FIG. 13 is an illustration of a screen display showing a browser in accordance with this invention.

When the user selects the overview button 49, a table of contents or "browser" window 272 is displayed near the bottom of screen 52 as shown in FIG. 13. The contents include a list of "subjects" (categories of information) 274 found within the book as defined by the author. As shown in this example, a book of "800" phone numbers includes such subjects as international air carriers, auto rental agencies, and express mail/package services. At the right side of the contents window, a "You are Here" indicator 276 is displayed. The purpose of this indicator is to show the user where he or she is located with respect to other subjects within a current book. That is, the indicator shows the subject area in which the current page resides. As shown in the example of FIG. 13, the indicator is pointing to "Domestic Air Carriers," a list of which is the displayed on the current page. If the "You are Here" indicator moves to a different subject, the current page will become the first page within the new subject. In some embodiments, the "Contents" heading 275 at the top of the browser window takes the form of a menu that lists various browser formats. For example, in addition to the table of contents view, the browser could also provide an index view with page numbers. If the user taps on an index entry, the current page automatically becomes the page on which the index entry appears. Other formats will be apparent to those of skill in the art.

Users can navigate to different subjects within the browser window by either (1) selecting a given subject in the browser by, for example, tapping on it, or (2) scrolling through the subjects with scroll buttons 66*a* and 66*b* shown in FIG. 2. Each time a new subject is selected by moving through the browser, two events take place: (1) the current (displayed) page becomes the first page available under the selected subject, and (2) the "You are Here" indicator moves such that it points to the selected subject. The browser window can be closed by selecting CLOSE button 286.

Figure 14:
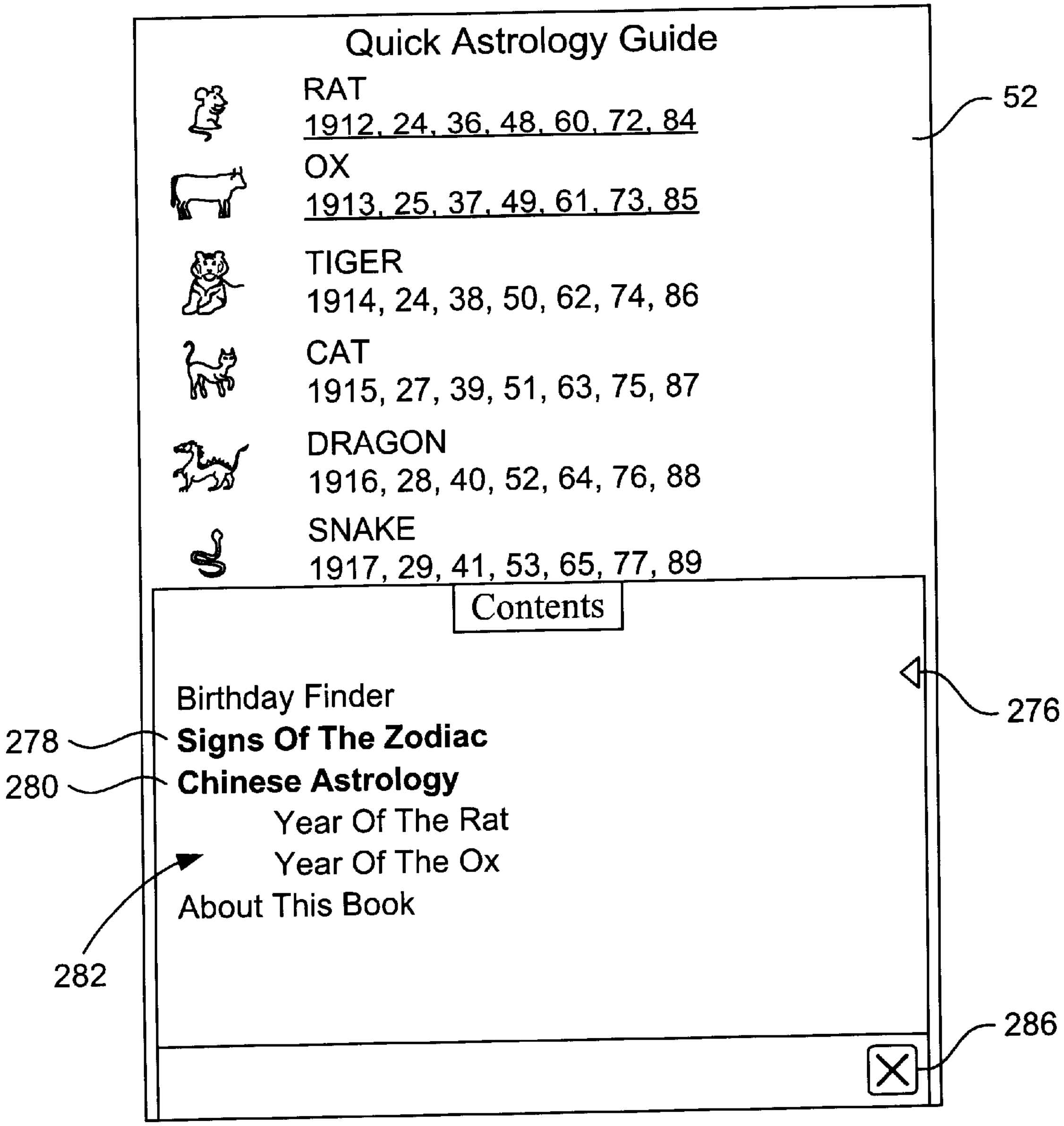
FIG. 14 is an illustration of a screen display showing a browser having subject entries with subcategories.

Some subjects displayed in the browser may contain subcategories which are displayed when the subject is selected (e.g., tapped). Subjects containing subcategories are generally shown in boldface as illustrated in FIG. 14. There, the subjects "Signs of the Zodiac" 278 and "Chinese Astrology" 280 are shown in boldface and, as expected, contain subcategories. In the example shown, "Chinese Astrology," has been selected and the subcategories "Year of the Rat" and "Year of the Ox" 282 are displayed underneath the subject heading. If the category heading is selected a second time, the subcatagories collapse into the catagory heading (i.e., they disappear). In addition, the currently displayed page reverts to the first page within the category heading (it may have a different page in the subcategory). In preferred embodiments, subcategories are displayed only if the subject under which they are included is directly selected by, e.g., tapping with a stylus. Thus, if a user scrolls through the various subjects listed in the contents window, the subcategories will not be displayed when the indicator button 276 points to a subject having subcategories. In alternative embodiments, subcategories will be displayed regardless of how the subjects are selected.

Figure 16:
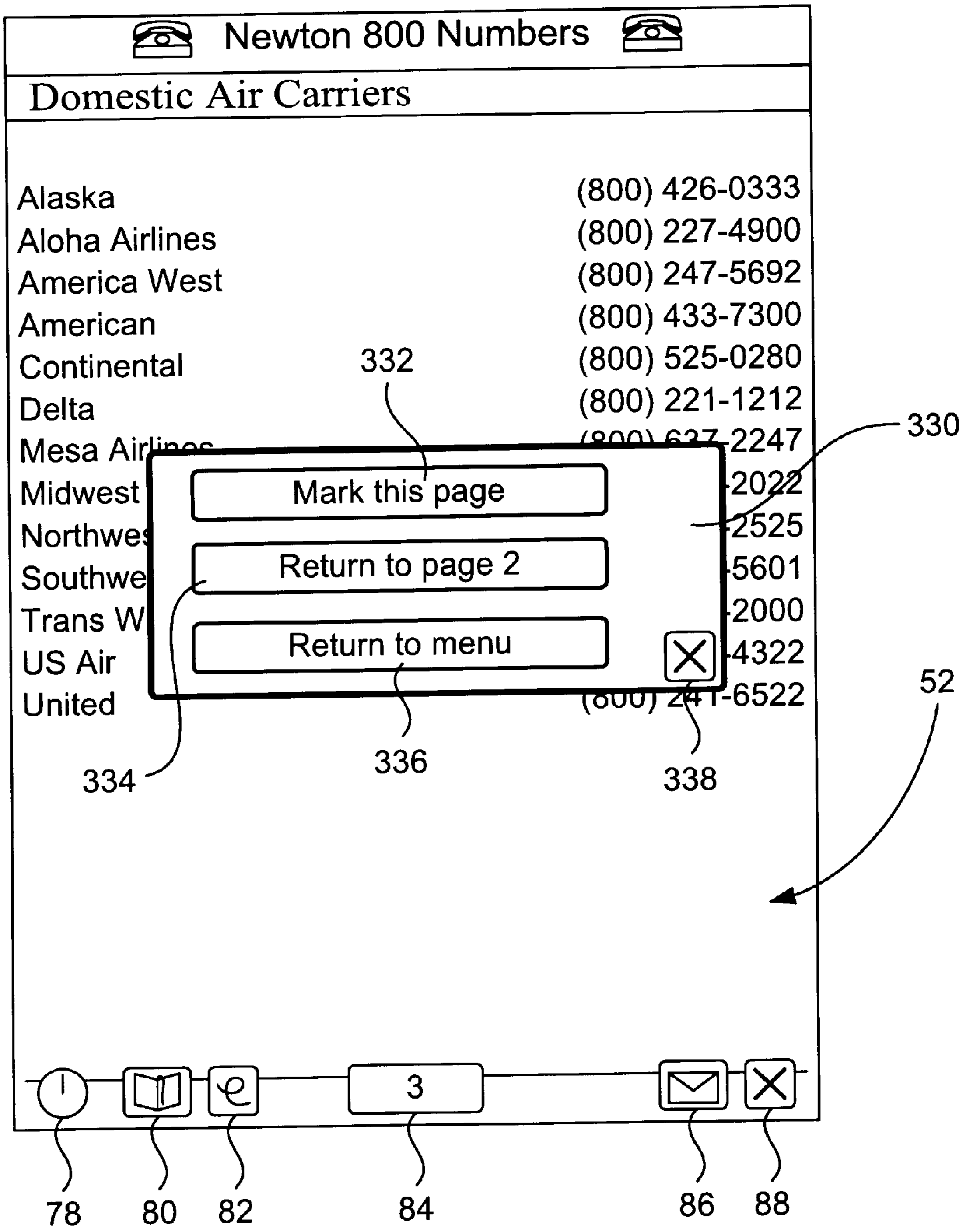
FIG. 16 is an illustration of a screen display showing a navigation dialog box in accordance with this invention.
Figure 17:
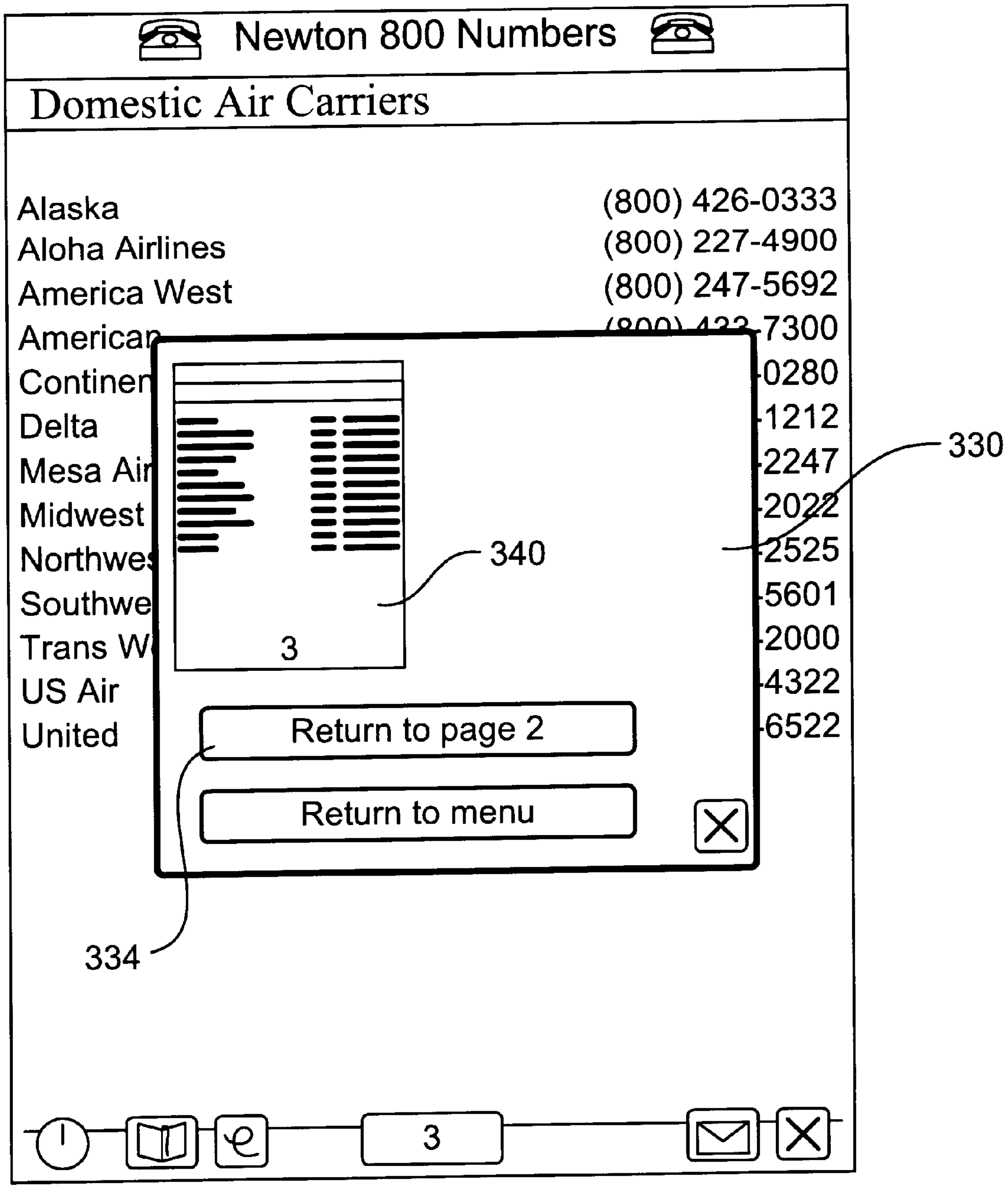
FIG. 17 is an illustration of a screen display showing a navigation dialog box with a bookmark displayed.

Another navigational aid available to the user is the bookmark or "navigation" window 330 shown in FIG. 16. This window can be opened on display screen 52 by tapping bookmark button 80 in the status bar of the content engine. In the embodiment shown, bookmark window 330 includes a mark page button 332, a return to previous page button 334, and a return to menu button 336. In addition, the bookmark window 330 includes a close button 338 which, when selected, will close the window. If mark page button 332 is selected, a "bookmark" is inserted at the current (displayed) page. The bookmark is preferably represented as a icon in the form of a miniature version of the marked page and displayed within bookmark window 330. An exemplary bookmark icon 340 is shown in FIG. 17. When a bookmark is created for a current page, the user can thereafter close the bookmark window 330 and go about performing other actions. When the user wishes to return to the marked page, he or she simply opens the bookmark window from anywhere in the book and then selects bookmark 340 (by, e.g., tapping). The marked page will then immediately become the current page. In preferred embodiments, bookmarks are automatically removed after a predefined number of new bookmarks have been added (e.g. six). In other words, the system only remembers a certain number of bookmarks. In alternative embodiments, individual bookmarks can be removed by the user.

Selecting the return to page button 334 of bookmark window 330 causes the content engine to change the current page to the immediately preceding current page. In other words, the page that had been displayed immediately before the current page is redisplayed when button 334 is selected. The number of that particular previous page will be shown within the return to page button 334. For example, as shown in FIGS. 16 and 17, the immediately previous page was page 2 while the current page is page 3 (as shown in page number button 84).

Figure 18:
FIG. 18 is an illustration of a screen display showing a kiosk or menu page in accordance with this invention.

Selecting the return to menu button 336 of bookmark window 330 causes the nearest previous menu page to be displayed. In preferred embodiments, the book will include various menu or "kiosk" pages throughout its content. Each of these menu pages lists various significant destinations within the book. In some embodiments, the actual name of the menu page (e.g., "airlines," "computers," etc.) may appear in the "return to menu" button. Thus, the button might display "return to airlines" or "return to computers" depending upon where in the book the user is currently located. An exemplary menu page is illustrated in FIG. 18. As shown, the menus page includes various entries identified by both name and icon. The actual format of the menu page is up to the individual author. For example, it may contain buttons rather than names or it may contain no graphics at all. In the embodiment shown, by selecting one of the listed items (e.g., "Auto Rental Agencies"), the system moves to the first page listing the auto rental agencies contained in the book.

If the user desires to include handwritten notes in the margins or other locations of a page, he or she first selects the "mark-up" button 82 to allow handwritten notes to be accepted on the current page. The user is then free to write anywhere on the screen without affecting the contents of the displayed page. The user's markings are simply stored as ink objects on an "overlay" of the current page. The markings can be hidden by tapping "mark-up" button 82 and then redisplayed by tapping "mark-up" button 82 a second time. In the example shown in FIG. 20, the user's markings designate times and flight numbers associated with various airlines (reference numbers 368 and 366).

Figure 22:
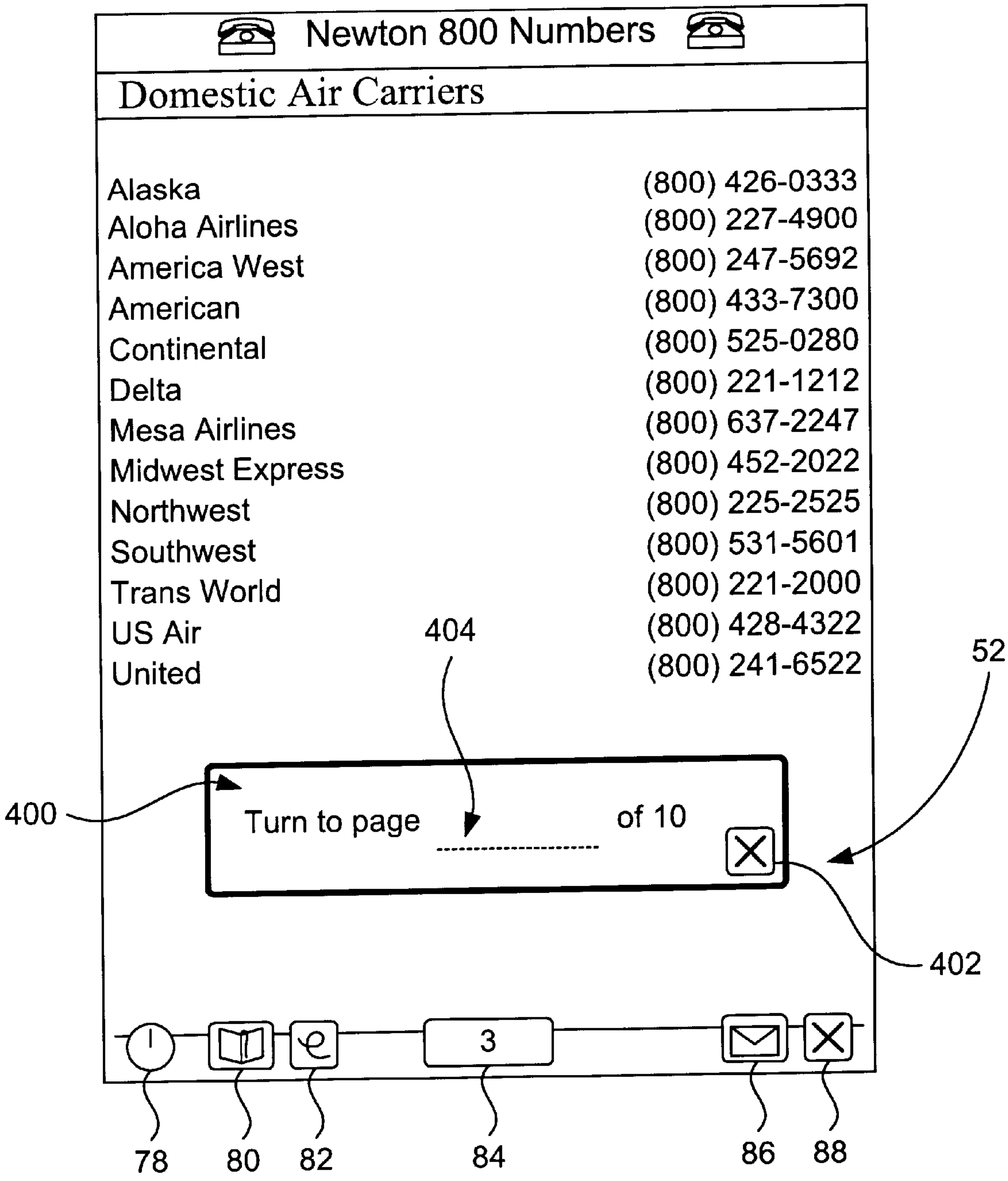
FIG. 22 is an illustration of a screen display showing a page number selection dialog box according to this invention.

In another feature, the user can turn to a specific page by first tapping on page number button 84 to display a page number dialog box 400 as shown in FIG. 22. Within the page number dialog box is a field 404 for inserting the desired page number. Typically, the user simply enters the page number he or she wishes to turn to by writing that number in field 404. The system then recognizes the number and automatically changes the current page to the page having the recognized page number. The new current page is then displayed on screen 52 and page number window 400 disappears. The user can also close the page number dialog box by selecting the close button 402 in the lower right corner of the page number window.

The process details associated with running interactive books according to this invention will now be discussed. An inventory of the installed books is maintained by a module known as a "librarian" which resides, at least in part, in memory of the computer system. In a preferred embodiment, the book content in the form of data structures known as "packages" is routed throughout the computer system. The routing process is controlled by via an entity known as a "package manager". Packages and package managers are discussed in more detail in U.S. patent application Ser. No. 08/099,841 filed Jul. 30, 1993 on behalf of Culbert and Welland, entitled STRUCTURE AND PROTOCOL FOR ROUTING INFORMATION IN A SYSTEM, and assigned to the Assignee of the present application. That application is incorporated herein by reference in its entirety for all purposes.

Figure 4:
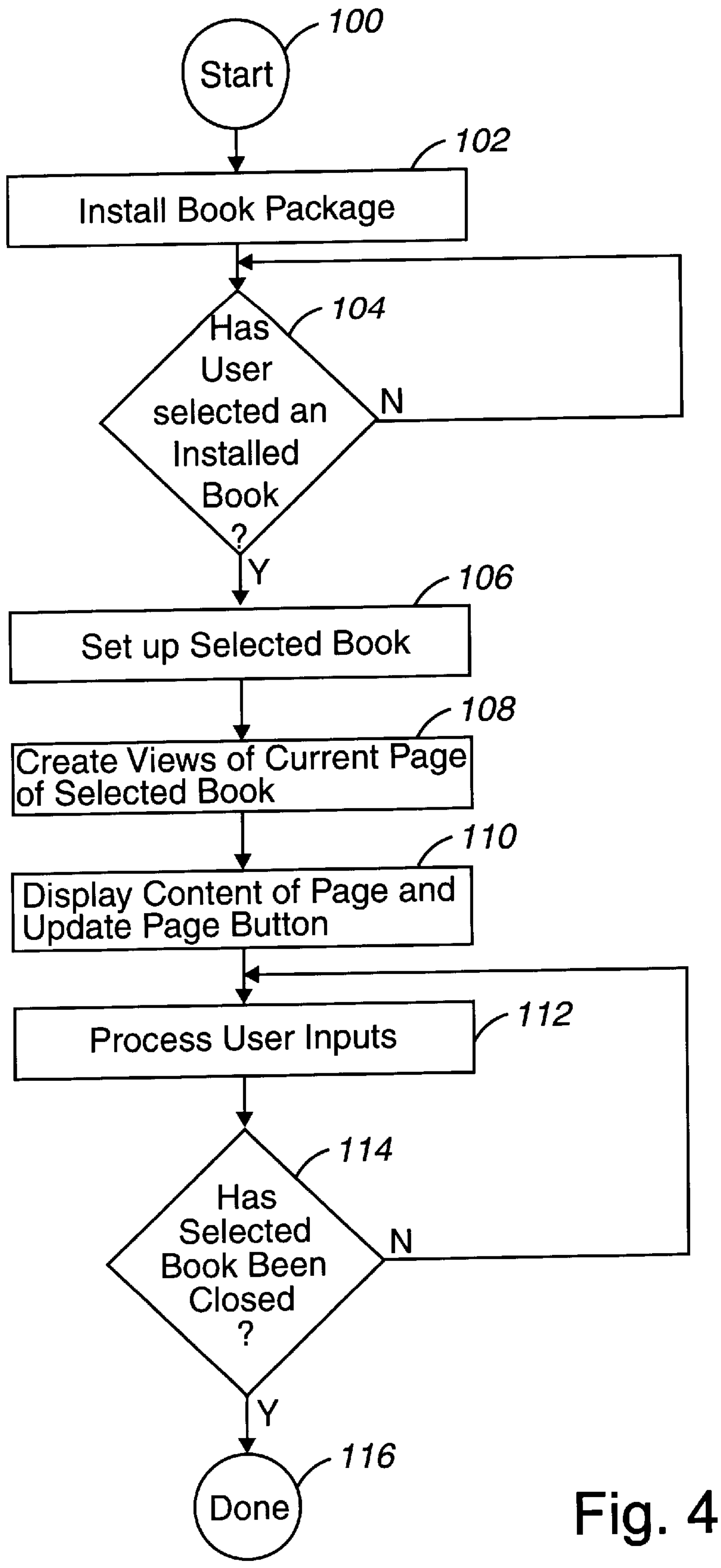
FIG. 4 is a process flow diagram of the general steps employed in installing, displaying, and interacting with a book or reference according to this invention.

Referring now to FIG. 4, an overview of the process of installing, opening, and using a book is illustrated according to a preferred embodiment of the invention. The process begins at 100 and proceeds to a step 102 where the book package is installed. After a book package has been installed in step 102, the system determines whether a user has selected the installed book in a decision step 104. This can be accomplished by tapping on an icon for the book in the extras drawer. If the user has indeed selected an installed book, the system moves to a process step 106 where the selected book is set up. The process of "setting up" a book will be described in more detail below in connection with FIG. 7. After set up, the process moves to a step 108 where views of the current page of the selected book are created. This step will also be described in more detail below. A process step 108 then displays the views created at step 108 and updates the page button 84. That is, button 84 shown in FIG. 3 is updated to display the number of the page currently appearing on display 52. At this point, the book is open and available to process user inputs in a step 112. These inputs can take a variety of forms and are preferably initiated by tapping buttons on status bar 76 (shown in FIG. 3) or dedicated function buttons 64 (shown in FIG. 2). These inputs will be described in more detail below. The buttons, menus, dialog boxes, etc. displayed on screen 52 during the user input stage provide various opportunities for the user to close the book. A decision step 114 determines whether this option has been elected; that is, whether the selected book has been closed. If so, the process is completed at 116. If not, process control simply returns to the point before step 112 where the system awaits further user inputs.

Figure 5:
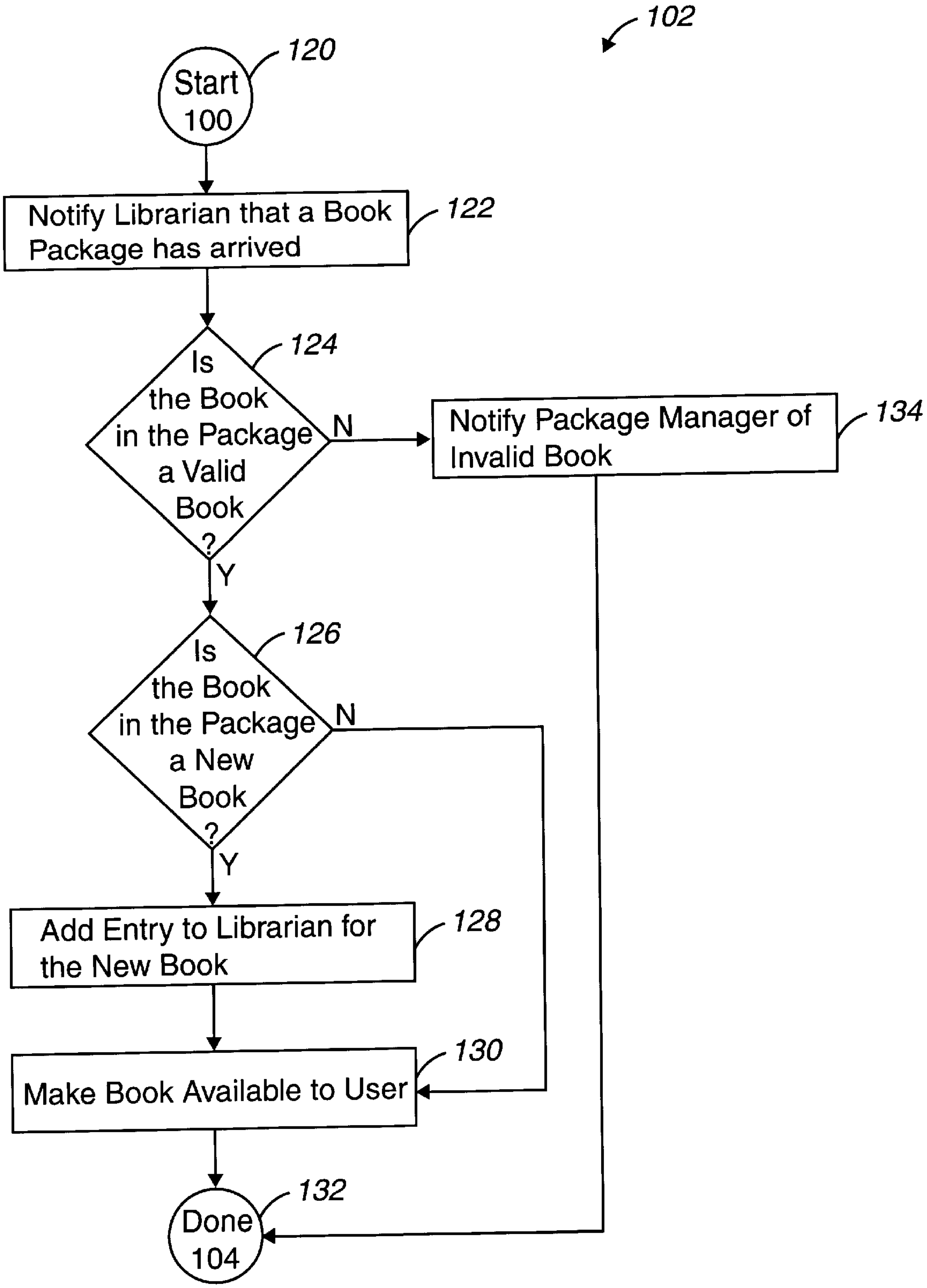
FIG. 5 is a process flow diagram detailing the steps employed in installing a book in a computer system according to this invention.

The process of installing a book package (step 102) will now be described in more detail with reference to FIG. 5. The process begins at 120 (which corresponds to starting point 100 in FIG. 4) and proceeds to a process step 122 where the librarian is notified by the package manager that a book package has arrived. Next, a decision step 124 determines whether the book in the package is a "valid book". This process will be described in more detail below with reference to FIG. 6. If decision step 124 determines that a book in the package is indeed a valid book, the process moves to a decision step 126 which determines whether the book is a "new" book. New books are those books which do not yet have an entry listed in the librarian. As noted above, each time a new book is installed, it is listed in the librarian. The listing remains in place even if the book is removed from the computer system. Eventually, after a predefined number of new books have been installed, the book's listing may be removed from the librarian. In a preferred embodiment, the oldest book may be removed from the librarian's listing after about six new books have been installed. If decision step 126 determines that the book is, in fact, a new book, a process step 128 adds an entry for the new book to the librarian. Thereafter, a step 130 makes the new book available to the user. That is, the librarian sends scripts necessary to have an icon for the book appears in the extras drawer. The process is then completed at 132 which corresponds to the point immediately before decision step 104 in FIG. 4.

If decision step 124 determines that the book in the package is not a valid book, the process moves to a step 134 where the package manager is notified of the invalid book. This information may be conveyed to the user by way of, for example, a dialog box appearing on screen 52. Thereafter, the process is completed at 132.

If decision step 126 determines that the book in the package is not a new book (in other words, there is already an entry in the librarian for the book), the process proceeds directly to step 130 where the book is made available to the user. The process is then completed at 132.

When the librarian adds a new book entry to its listing (step 128), it also installs any "intelligent assistance" templates that are associted with the book. For example, an assist template may respond to the assist command "reserve room" by opening the book of toll-free phone numbers to the page listing hotels, motels, and inns. Intelligent assistance routines are described in more detail in U.S. patent application Ser. No. 07/889,225, filed on May 27, 1992, naming Luciw as inventor, and entitled "Deducing User Intent . . . ," which is incorporated herein by reference for all purposes. Assist templates are simply stored in memory as scripts for the action. When the book is removed, any associated intelligent assistance scripts are automatically removed. As noted however, the librarian book entry remains even after the book has been removed.

Figure 6:
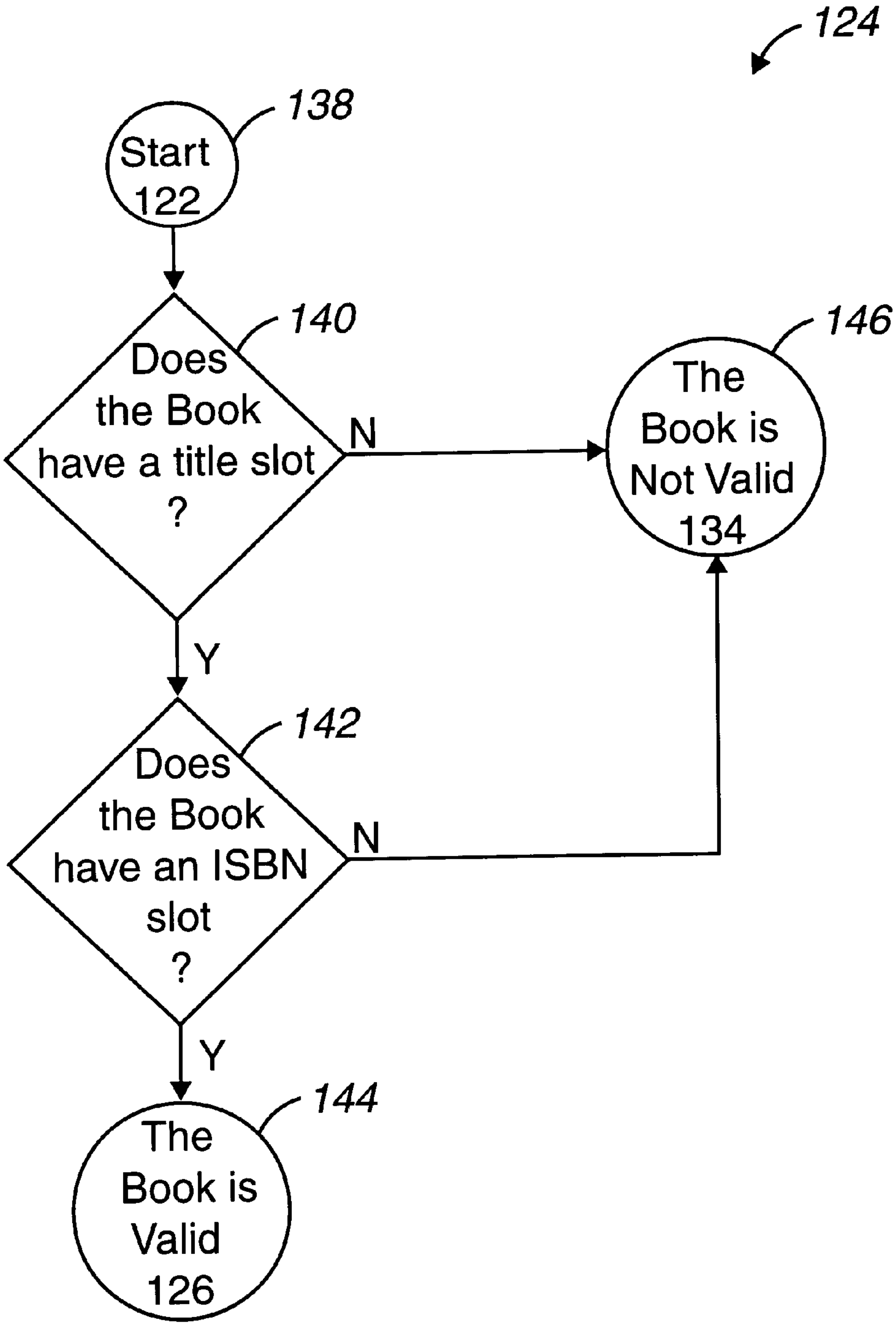
FIG. 6 is a process flow diagram showing the decisions employed to determine whether a book is a "valid" book.

The steps involved in determining whether a book is a valid book (decision step 124 shown in FIG. 5) are detailed in FIG. 6. The process begins at 138 which corresponds to step 122 of FIG. 5. Thereafter, two questions may be asked. First, a decision step 140 determines whether the book has a title slot, and second a decision step 142 determines whether the book has an ISBN slot. As used herein, a "slot" is a region of a frame (in this case a content frame) reserved for a particular type of information. The title slot is, of course, reserved for the book's title. If the alleged book does, in fact, have a title slot, the process proceeds to a decision step 142 which determines whether the books has an ISBN slot. Most published books in circulation throughout the world have an ISBN for identification. Usually, it takes the form of a series of numbers separated by dashes. Because an electronic book is in many regards like a conventional paper and ink book, authors of electronic books are encouraged to follow many of the protocols established for conventional books. One of these is obtaining an ISBN. If decision step 142 determines that the book does have an ISBN slot, the process proceeds to 144 where the book is deemed valid (i.e., in the process shown in FIG. 5, decision step 124 is answered in the affirmative and the process moves to decision step 126). If either of decision steps 140 and 142 are answered in the negative, step 146 indicates that the book is invalid. This corresponds to a negative answer to decision step 124 in FIG. 5. Thus, the package manager is notified of an invalid book.

Figure 7:
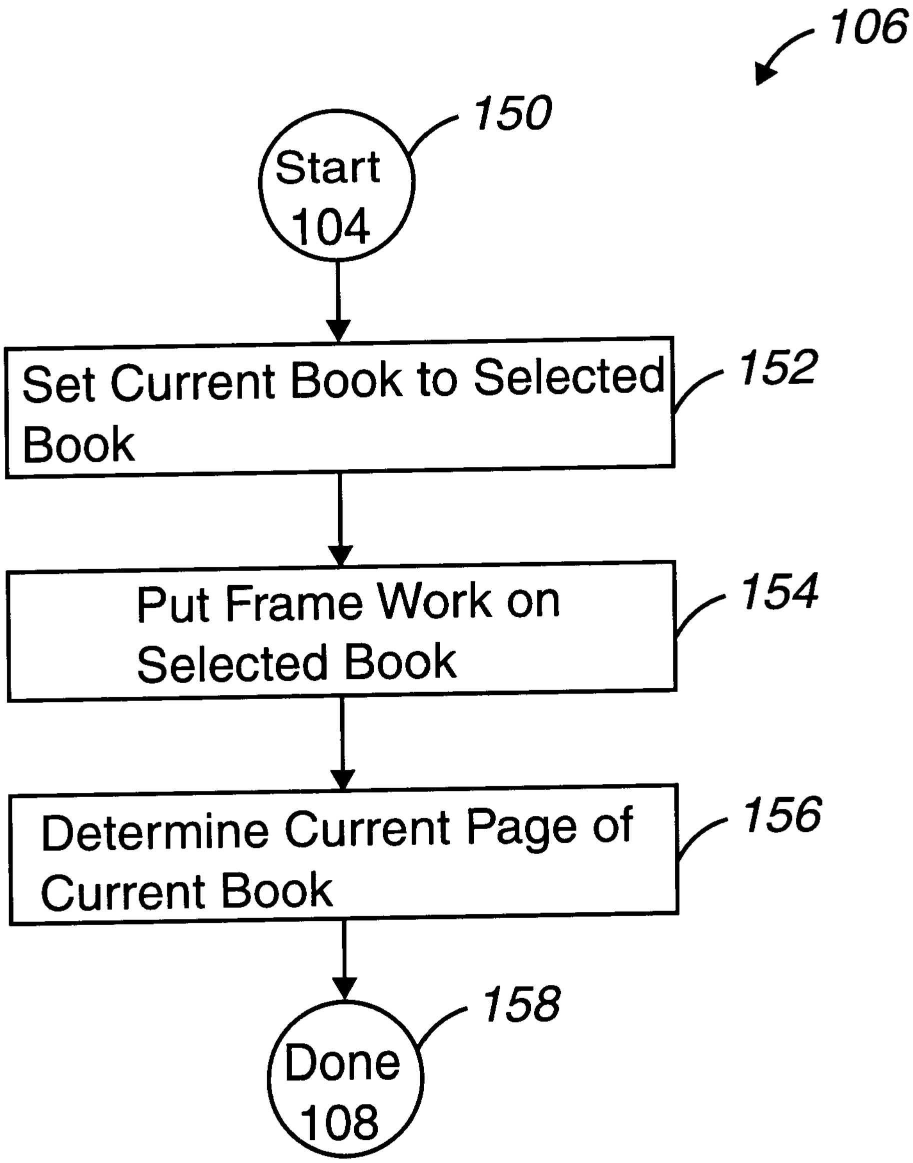
FIG. 7 is a process flow diagram showing how a book can be set up for display according to the present invention.

The process of setting up a book that has been selected by the user (process step 106 of FIG. 4) is detailed in FIG. 7. The process begins at 150 which corresponds to a point after decision step 104 in the process shown in FIG. 4. Thereafter, the variable "CURRENT BOOK" is set to the selected book in a step 152. The CURRENT BOOK is simply the book which has been opened and is available for display, receiving user inputs, etc. After step 152, the process proceeds to a step 154 which puts a "framework" around the display of the selected book. A "framework" refers to a standard border that the content engine causes to be displayed around every book page. Part of this framework preferably includes status bar 76 shown in FIG. 3. Of course, other items may be incorporated within the framework such as headers and sidebars. Preferably, the framework includes "live" items such as buttons which process user input. An "interaction" module (independent of the librarian module) is responsible for installing the framework and supporting the live screen functions.

After the framework has been installed by step 154, the process proceeds to a step 156 which determines the CURRENT PAGE of the selected book. In preferred embodiments, the librarian module is responsible for making this determination. The CURRENT PAGE may be the first page or a menu page of the selected book. However, this is by no means always true. For example, the book may also open to the last displayed page of the book before it was closed. The system simply consults the librarian module to determine which book page is the current page. Thereafter, the process is completed at 158 corresponding to the point before step 108 in FIG. 4.

Figure 8:
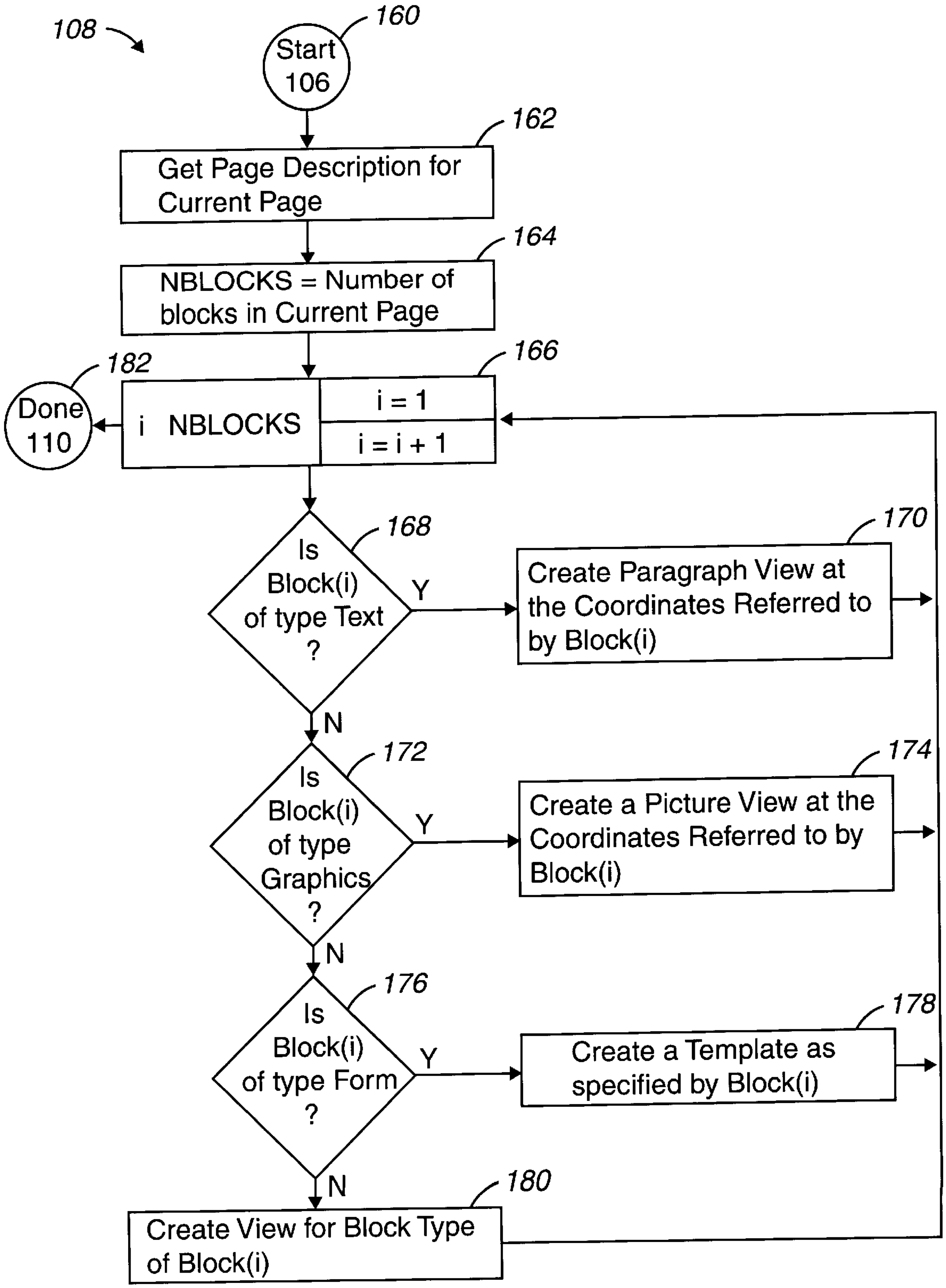
FIG. 8 is a process flow diagram detailing how a book page can be displayed.

FIG. 8 details the process of creating views of the current page (step 108 of FIG. 4). Preferably, the process is controlled by an entity known as a "page module" (a counterpart of the librarian and interaction modules described above). The process begins at 160 and proceeds to a step 162 in which receives a description of the current page. The description will include various blocks describing how content is to be displayed on the current page. The blocks and the instructions they provide will be described in more detail below. Briefly, a block describes a unit of content such as a graphic object or a text paragraph. From step 162, the process proceeds to a step 164 which sets a variable NBLOCKS equal to the number of blocks in the current page. Next, an iterative loop step 166 initializes a block counter "i" to one and determines whether "i" is less than or equal to NBLOCKS. If step 166 determines that "i" is less than NBLOCKS, the process moves to a decision step 168 which determines whether Block(i) is a text block. This decision is made by looking at the content referenced by Block(i) and determining whether it has a slot indicating that it contains text. If decision step 168 determines that Block(i) is a text block, a process step 170 creates a paragraph view at the coordinates referred to by Block(i). Thereafter, process control returns to iterative loop step 166 where the counter i is incremented by 1. If decision step 168 determines that Block(i) is not a text block, the process proceeds to a decision step 172 which determines whether Block(i) is a graphics block. If so, a process step 174 creates a picture view at the coordinates referred to by Block(i). Process control then returns to iterative loop step 166 where the counter i is incremented by one. If both decision steps 168 and 172 respond in the negative, a decision step 176 determines whether Block(i) is a "template" or "form". If decision step 176 determines that Block(i) is indeed a template or form, it creates a template as specified by Block(i). The template may be, for example, a dialog box, a button, or other "live" screen feature that the author wishes to include in the current page. After the template has been created by step 178, process control returns to iterative loop step 166 where the counter i is incremented by one. In preferred embodiments, the block type will be either text, graphics, or form. In alternative embodiments, however, other block types might be included such as sounds, movies, animations, and tabular data. If the system encounters such a block (i.e., decision steps 168, 172 and 176 are all answered in the negative), the process will proceed to a step 180 which creates a view for the alternative block type. Process control then returns to the iterative loop step 166.

The system continues to loop through all blocks on the current page until i equals NBLOCKS. In other words, the last block on the current page has been processed. Thereafter, the process is completed at 182 corresponding to step 110 of FIG. 4. At that step, the contents of the current page are displayed on screen 52 according to the views created at steps 170, 174, 178, and 180.

A paragraph view (created in step 170) is simply a description of the text information that will be displayed on screen 52. A picture view (created at step 174) is likewise a description of the picture that will be displayed on screen 52.

The block structure described above is preferably created by an application which converts documents such as word processing documents into structures that can be read as books by a content engine of this invention. The application which creates such books can, but need not, reside on the same computer system as the content engine of this invention. Methods of creating electronic books and the block structure referred herein are described in U.S. patent application Ser. No. 08/147,055 filed on the same day as the present application, naming the same inventive entity, entitled METHOD FOR PREPARING ELECTRONIC BOOKS, and is incorporated herein by reference for all purposes.

FIG. 9*a* shows how the blocks might be arranged for a current page. In the example shown, the current page is page 5 which includes three blocks identified as B1, B2, and B3 at the left side of array 184. Each row of array 184 corresponds to a different block. The blocks include coordinates 186 which specify the location on screen 52 where the block will be displayed. In addition, they include a content identifier 188 which refers to a frame (stored elsewhere) containing the content that will ultimately be on the page at the coordinates specified by the array. In the example shown, content C36 is associated with block 1, content C37 is associated with block 2, and content C38 is associated with block 3. As noted the content may take various forms including text, graphics, and templates for interactive displays. In some cases, one or more scripts specifying actions to be taken in connection with the page will be included within page description 184. These actions can include, for example, displaying a dialog box if a certain content within the page is selected.

FIG. 9*b* shows a hypothetical text content frame. First, it includes a slot 161 for the actual text that appears in the content. Next, it includes a "styles" slot 163 which specifies the style associated with each character. Typically, each style will be given a code which is specified in the styles slot beside a character number for the first character to which the style is applied. The character number is typically an offset from the beginning of the text stream. Thus, if the fifth character of the stream begins a text segment to be displayed in bold-face, the style slot may have code for bold-face adjacent the number five (referring to the fifth character of the stream). The text content also includes a layout slot 167 which may specify such features as whether the text is centered, has borders, forms a sidebar, etc. Further, the text content may also include a scripts slot 165 containing scripts for certain actions to be taken in connection with the text content. Still further, various attributes may be associated with any content such as one or more colors, a phone number, a food type, a city, etc.

FIG. 9*c* illustrates a graphics content. The first slot 169 indicates that the content is an icon and provides instructions for drawing the icon. The instructions may be in, for example, a bit map, quick draw instructions, postscript instructions, etc. Next, a layout slot 171 specifies that the graphics will be displayed in side-by-side mode. In addition, a script slot 173 includes scripts for taking action in connection with the graphic. The action can include, for example, displaying a particular page or dialog when a user taps on the graphic. Finally, "Food" and "City" attributes associated with the content are provided in the bottom two slots.

As noted above, many live features including buttons, lists, dialog boxes, etc. may be provided on display screen 52 for processing user inputs. The general step of processing user inputs (step 112 of FIG. 4) is now discussed in greater detail with reference to FIG. 10. The process begins at 200 and involves various possible user interactions which are represented by decision steps 202, 204, 206, 208, 210, 212, 214, 216, and 218. This list of user inputs is intended to be illustrative rather than all inclusive. Thus, various functions different from or in addition to those described in FIG. 10 may be provided in other embodiments. In the preferred embodiment shown, a decision step 202 determines whether or not one of the scroll arrows (66*a* and 66*b* shown in FIG. 2) has been selected. If not, the system determines whether or not the overview button (49 of FIG. 2) has been selected. If the overview button has not been selected, the system determines whether the bookmark button (button 80 shown in FIG. 3) has been selected. At decision step 208, the system determines whether the mark-up button (button 82 of FIG. 3) has been selected. At decision step 210, the system determines whether the page number button (button 84 of FIG. 3) has been selected. At decision step 212, the system determines whether the routing slip button (button 86 of FIG. 3) has been selected. At decision step 214, the system determines whether the close button (button 88 of FIG. 3) has been selected. If the close button has been selected, a step 220 closes the book as well as the book reader application and the process is completed at 224. At decision step 216, the system determines whether any specific content gestures have been provided. At decision step 218, the system determines whether any system events need to be processed. A system event may be, for example, a find request or an intelligent assistance request associated with function buttons 64 shown in FIG. 2. If any of decision steps 202, 204, 206, 208, 210, 212, 216, and 218 are answered in the affirmative, the selection is processed at a step 208, 205, 207, 209, 211, 213, 217, or 219, respectively. The process is thereafter completed at 224. Each of these processed steps will be described in more detail below.

Although many of the processes (particularly those associated with function buttons described herein) are diagrammed in a manner that could imply that the system checks for certain actions by event loops or polling, no such limitation is implied. This format has been employed to emphasize that the invention is, in part, directed to processes or protocols. As is well-known in the art, some object- or frame-based systems do not employ polling. Rather, they use a script or template associated with each function button which is simply activated upon selecting that button. The template then directs the specific action associated with that button; such as displaying dialog boxes, menus, etc. For example, the system might detect a "pen down" event, determine what entity (maybe a view) should receive that event, and send a message (e.g., view clicked) to that view. Further, the drawings often show a sequence of decision steps pertaining to user events, with the steps having a specified order. The actual order may be different from that displayed and may depend only the order in which the user takes certain actions. Thus, the process flow charts provided herein should not be read to imply that the system necessarily checks for user events in the order listed.

Figure 10:
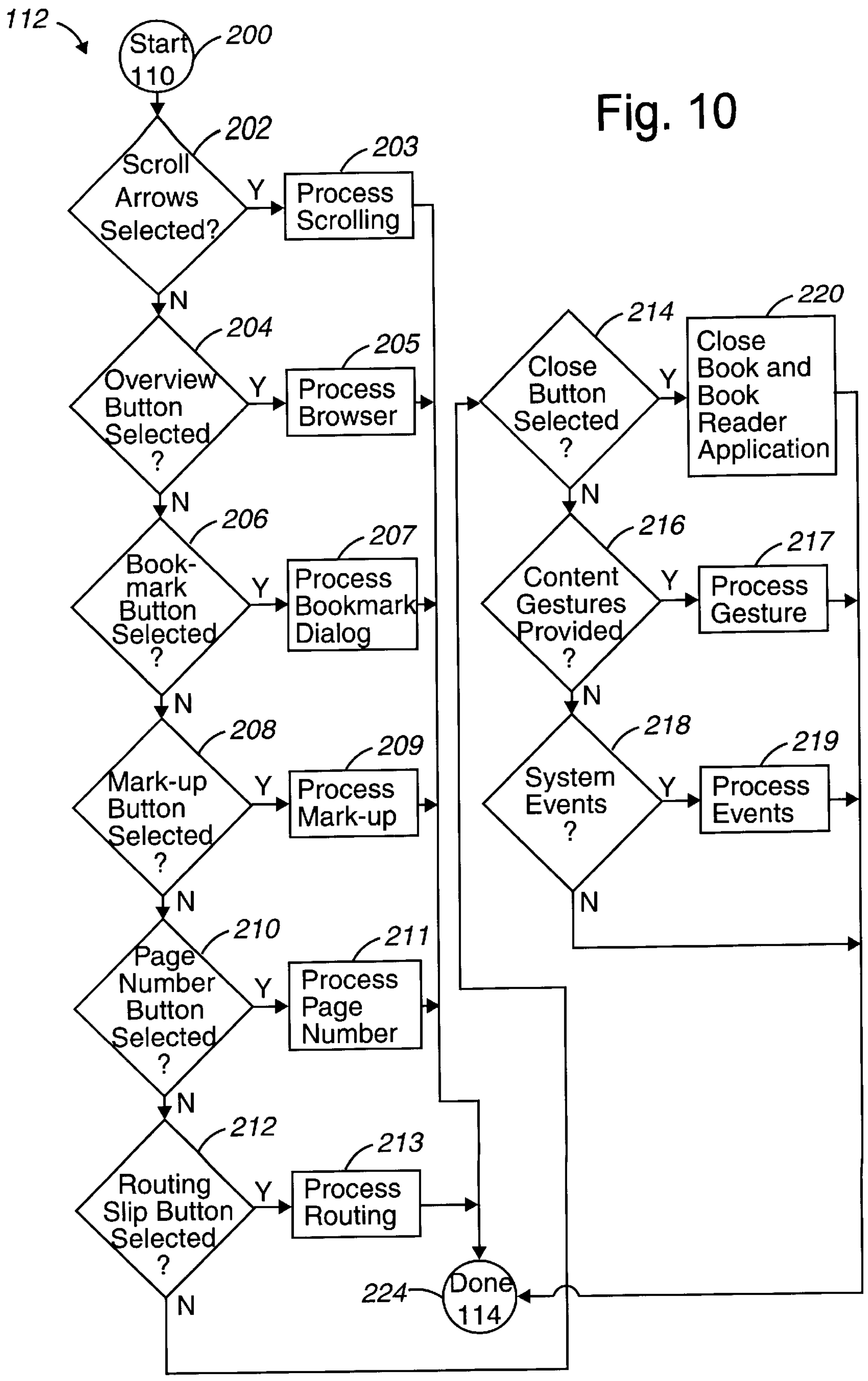
FIG. 10 is a process flow diagram showing various user inputs that can be processed in accordance with the present invention.
Figure 11:
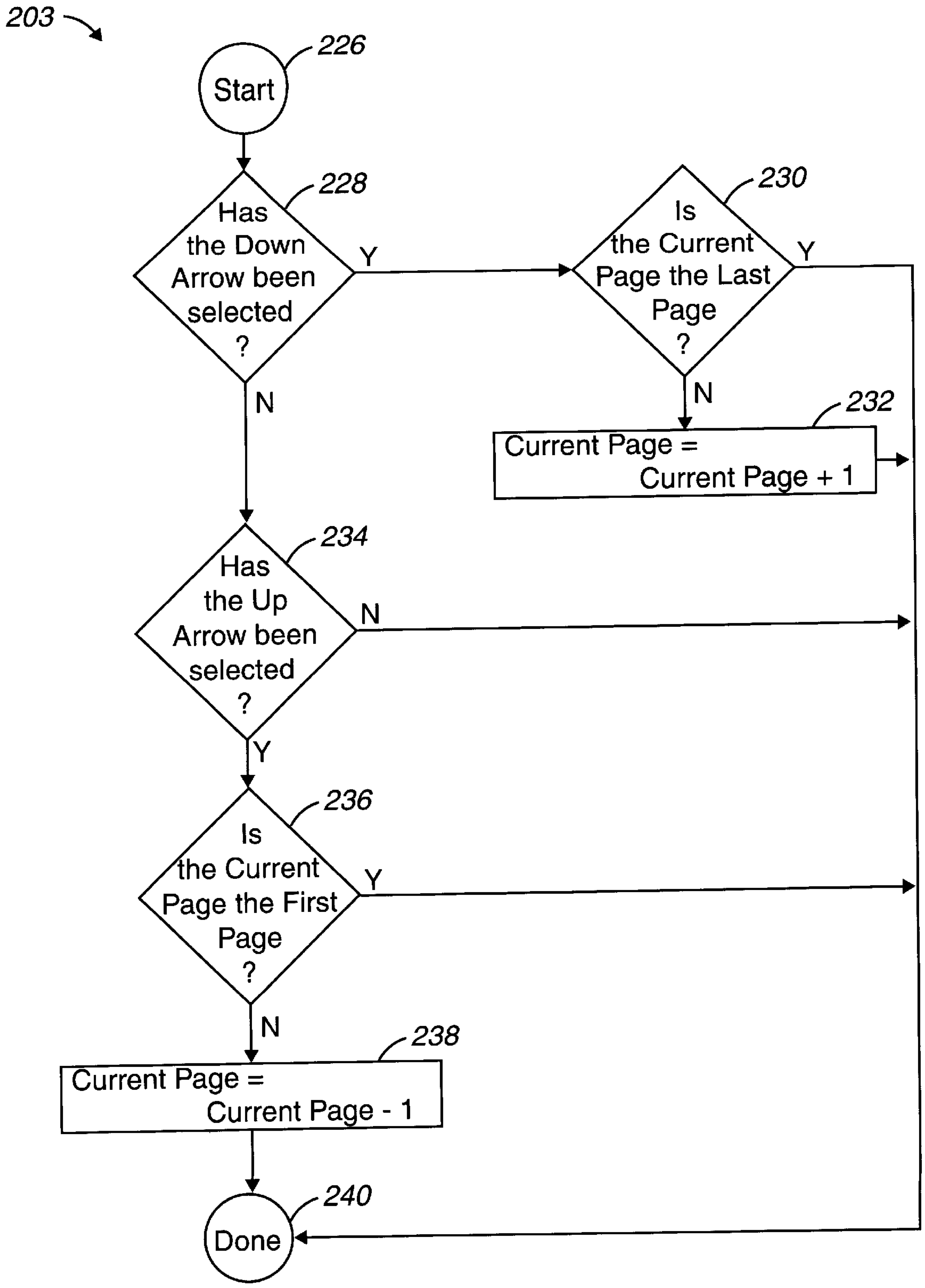
FIG. 11 is a process flow diagram detailing the process of scrolling through pages of a book according to this invention.

FIG. 11 details the scrolling process (step 203 of FIG. 10). The process begins at 226 and proceeds to a decision step 228 which determines whether the down arrow 66*b* has been selected. If so, the process proceeds to a decision step 230 which determines whether the current page is the last page of the selected book. If it is not, a process step 232 increments the current page by one. At this point, the views for the page are created and displayed as described above. Thereafter, the process is completed at 240. If decision step 230 determines that the current page is, in fact, the last page, no change occurs and the process is completed at 240.

If the down arrow has not been selected, decision step 228 directs the process to another decision step 234 which determines whether the up arrow has been selected. If it has, the process proceeds to a decision step 236 which determines whether the current page is the first page. If not, a step 238 sets the current page equal to the current page minus one. Thereafter, views for the preceding page (the new current page) are created and displayed as described above, and the process is completed at 240.

Figure 12:
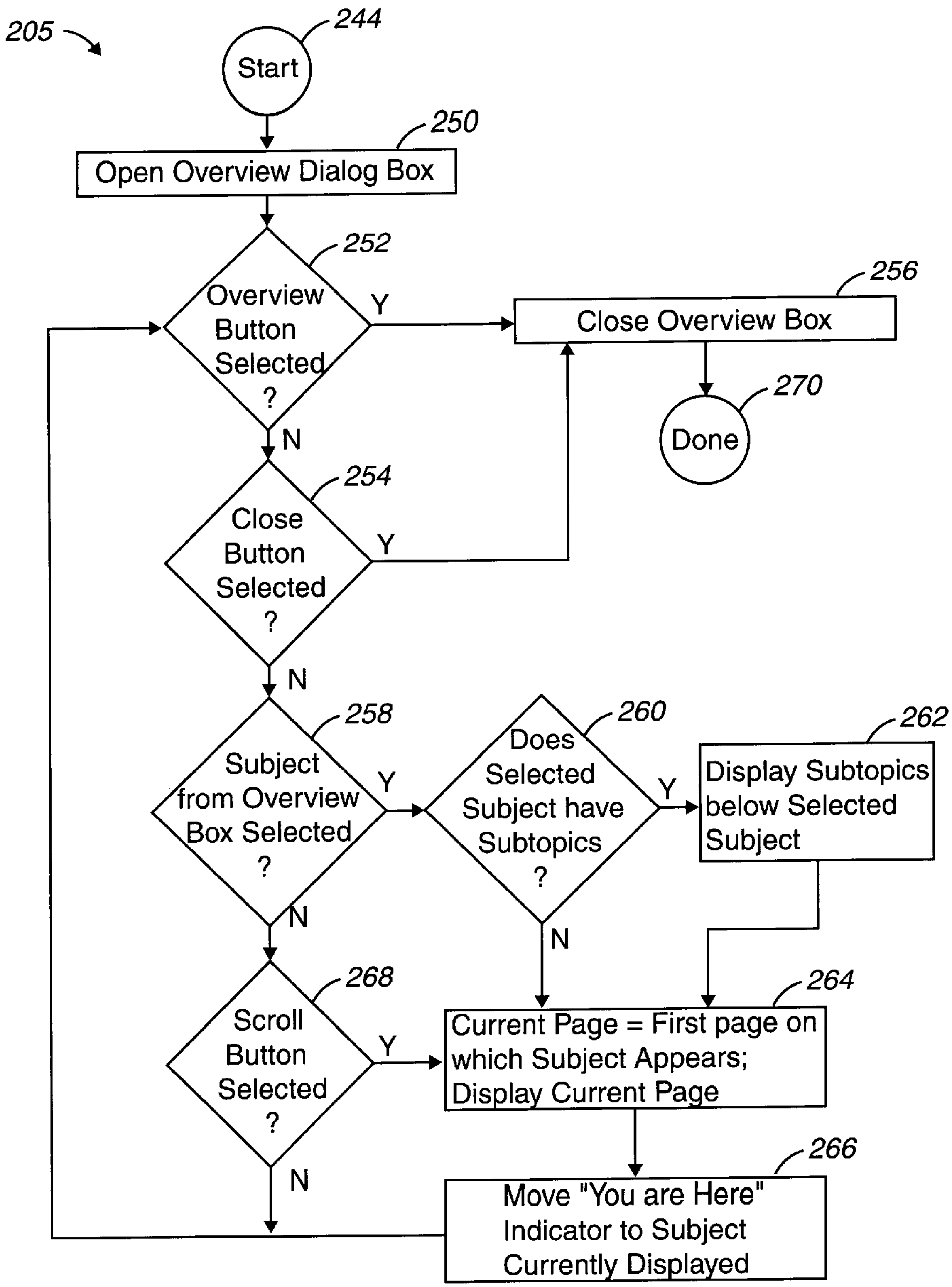
FIG. 12 is a process flow diagram detailing the operation of a browser according to this invention.

FIG. 12 details the processes associated with the table of contents or "browser" (step 205 of FIG. 10). The action of the browser preferably is controlled by a browser module (a counterpart of the librarian, interaction, and page modules described above). The process begins at 244 and proceeds to a process step 250 which opens the overview dialog box (i.e., the browser) The overview dialog box can be closed by two different actions: selecting the close button 286 (FIG. 13) or the overview button 49 (FIG. 2). Thus, two decision steps determine whether the overview dialog box is to be closed. First, a decision step 252 determines whether the overview button has been selected. Then, a decision step 254 determines whether the close button 286 has been selected. If either of decision steps 252 or 254 are answered in the affirmative, the overview box is closed by a process step 256, and the process is completed at 270. As long as neither the overview button nor the close button have been selected, decision step 258 determines whether a subject 274 displayed in the overview box has been selected. If so, a decision step 260 determines whether the selected subject has subtopics. As noted above, subjects having subtopics are displayed in boldface within the overview box. Examples of such subjects 278 and 280 are shown in FIG. 14. If decision step 260 determines that the selected subject does indeed have subtopics, a process step 262 displays those subtopics below the selected subject as shown in FIG. 14. The subtopics are then available as subjects for selection. After the subtopics have been displayed by step 262 (or if the answer to decision step 260 is negative), the process proceeds to a step 264 which sets the current page equal to the first page on which the selected subject appears. For example, if the selected subject includes two subtopics, the current page will become the first page of the first of the two subtopics. After the current page has been set, views of the contents of that page are created and displayed as described above in connection with FIG. 8. Next, a process step 266 moves the "You are Here" indicator 276 such that it points to the currently-displayed subject, as explained above. Thereafter, process control returns to a point immediately before decision step 252.

If the overview box has not been closed (either by selecting the overview button 49 or the close button 286) and a subject from the overview box has not been selected (i.e., decision step 258 is answered in the negative), a decision step 268 determines whether a scroll button 66*a* or 66*b* has been selected by, e.g., tapping. If so, the current page is set equal to the first page on which the new subject appears in step 264. The new subject will then be the subject either preceding or following the current subject depending upon whether the up or down scroll button has been selected. Thereafter, the process moves to step 266 which, as described above, moves the indicator button to the appropriate location. Thereafter, process controls return to decision step 252. If each of decision steps 252, 254, 258, and 268 is answered in the negative, the system awaits selection of either the overview button, the close button, a subject from the overview box, or a scroll button.

Figure 15:
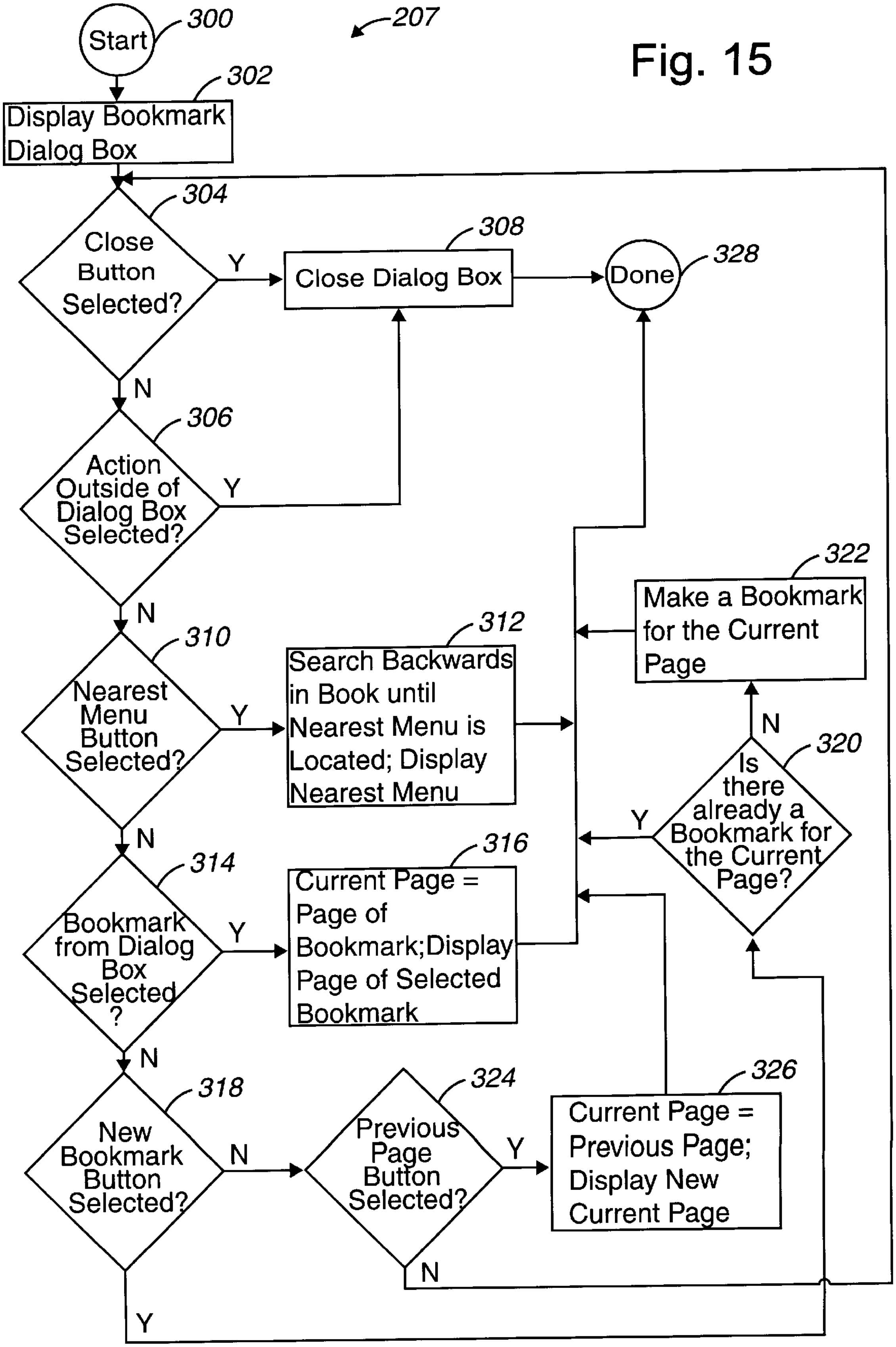
FIG. 15 is a process flow diagram detailing the operation of a navigation dialog in accordance with this invention.

FIG. 15 details the process by which selection of the bookmark button 80 is processed. The process begins at 300 and proceeds to a step 302 which displays the bookmark (or "navigation") dialog box. The user can then take various actions within the dialog box by tapping one of the live action buttons or features shown in FIGS. 16 and 17. Specifically, the user can select close button 338, "return to menu" button 336, "mark this page" button 332, "return to page__" button 334, or bookmark 340. In addition, the user can take an action outside of navigation dialog box 330. Whether the user takes any of these steps is depicted by decision steps 304, 306, 310, 314, 318, and 324 in FIG. 15. Each user action will elicit a system response followed by closing the dialog box.

After the dialog box has been displayed in the depicted process, a decision step 304 determines whether the close button (button 338 of FIG. 16) has been selected. If so, a step 306 closes the bookmark dialog box and the process is completed at 328. If the close button has not been selected, the process proceeds to a decision step 306 which determines whether the user has taken any action outside of the dialog box. For example, the user might select a scroll button 66*a* or the overview button 49, in which case the bookmark dialog box will be closed in step 308. If both decision steps 304 and 306 are answered in the negative, a decision step 310 determines whether the return to nearest menu (or other named page) button 336 has been selected. If so, a process step 312 searches backwards through the book until the first menu page is located. That menu page is then displayed as shown in FIG. 18. Process control then proceeds to steps 308 and 328 where the dialog box is closed and the process is completed. If decision step 310 determines that the return to nearest menu button 336 has not been selected, a decision step 314 determines whether a bookmark 340 (e.g., 340 in FIG. 17) has been selected from dialog box 330. If so, a step 316 sets the current page equal to the page of the bookmark and then creates views and displays the contents of the new current page as described above. Thereafter, process control returns to steps 308 and 328 as described above.

If decision step 314 determines that a bookmark has not been selected from the dialog box, the process moves to a decision step 318 which determines whether the "mark this page" button 332 (FIG. 16) has been selected. If so, a decision step 320 determines whether a bookmark already exists for the current page. Because only one bookmark should be inserted in a given page, an affirmative answer to decision step 320 results in the system ignoring the request to create a new bookmark. The process then proceeds to steps 308 and 328. If there is no bookmark on the current page, a process step 322 creates a new bookmark for the current page and returns process control to step 308. If the "mark this page" button has not been selected, decision step 318 directs the process to decision step 324 which determines whether the "return to previous page" button 334 (FIG. 16) has been selected. If so, a process step 325 sets the current page equal to the previous page (i.e., the page displayed immediately before the currently displayed page) and displays the previous page (i.e., the new current page) as described above. Thereafter, process control returns to step 308. If none of the user events described in decision steps 304, 306, 310, 314, 318, and 324 has occurred (i.e., the answer to each of these steps is negative), the system awaits the occurrence of one of them by keeping the dialog box open. This is represented by the process control looping back to step 304 from step 324 when the answer to step 324 is negative.

Figure 19:
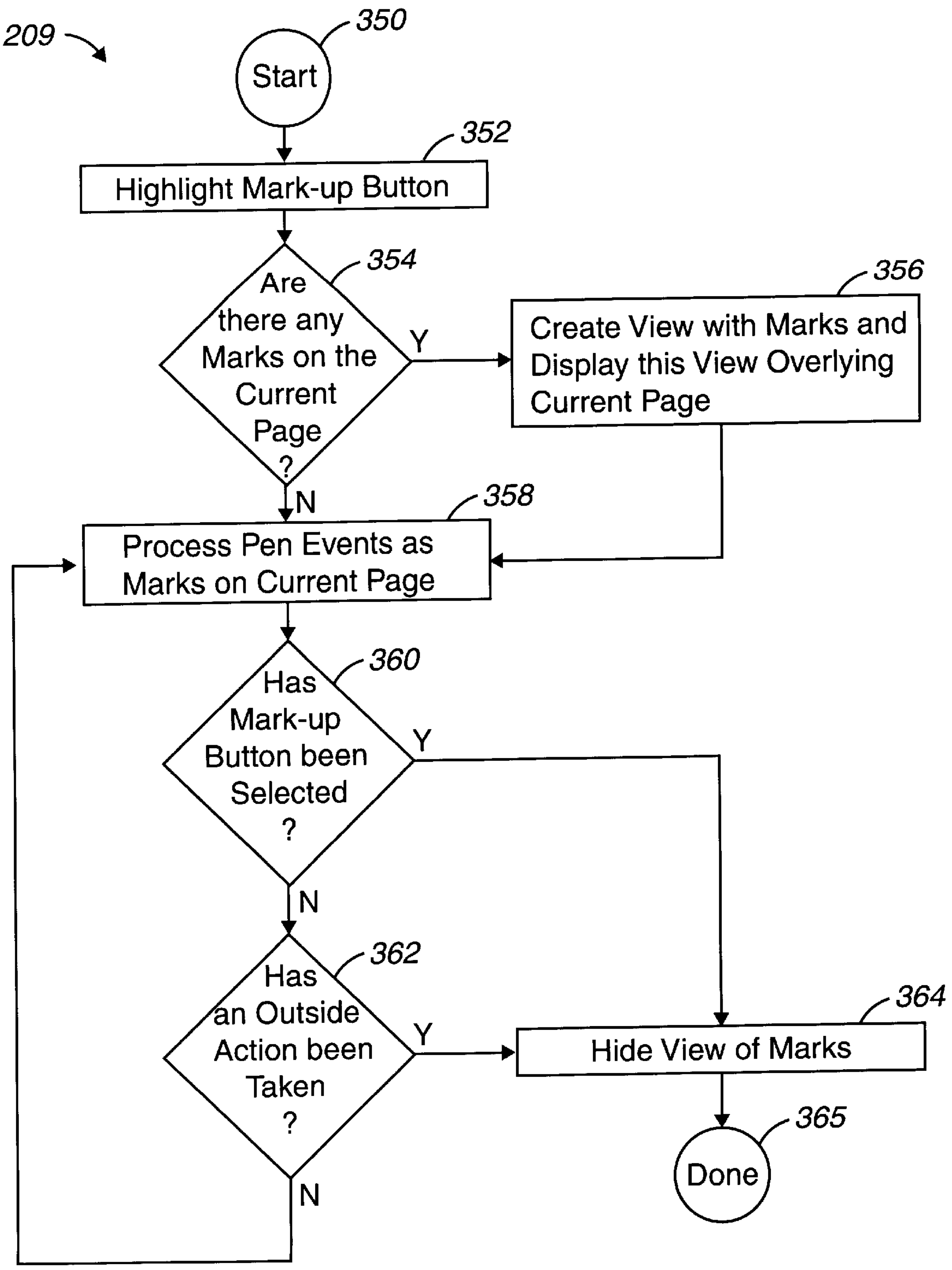
FIG. 19 is a process flow diagram detailing the operation of the invention in "mark-up" mode.

FIG. 19 details the procedure employed when the mark-up button is selected at step 208 of FIG. 10. This aspect of the invention allows the user to jot down notes on the screen without disturbing the underlying content of the page. The writer is, in effect, writing on a transparent overlay on the displayed page. If the user moves to another page and then returns to the marked-up page, he or she can redisplay the original marks. In some preferred embodiments, any buttons, menus or other "live" features on the screen become inactivated when the mark-up mode is selected.

Figure 20:
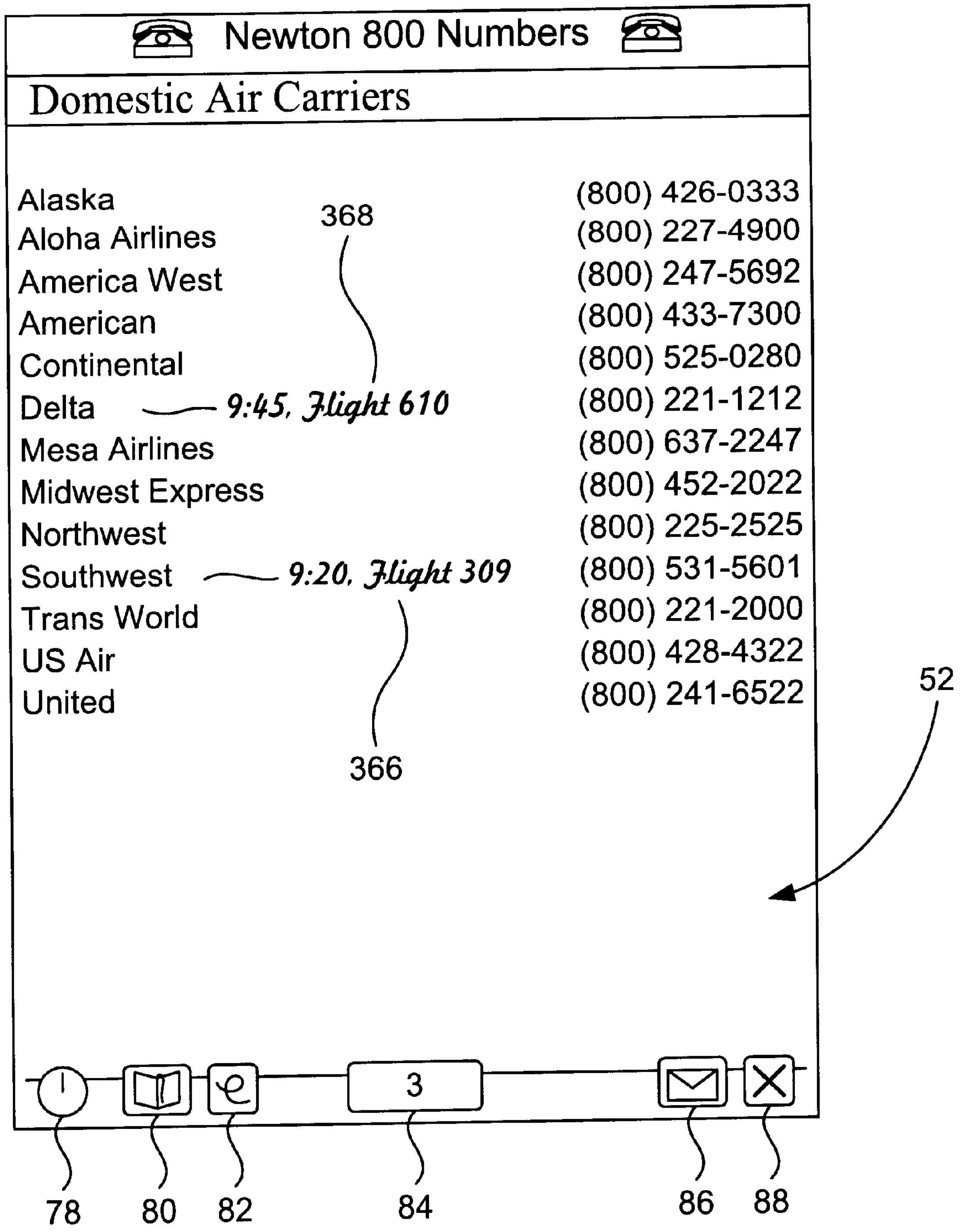
FIG. 20 is an illustration of a screen display in which a book page has had handwritten notes provided thereon.

The process begins at 350 and proceeds to a process step 352 which highlights the mark-up button 82 (i.e., it becomes darker) and then to a decision step 354 which determines whether there are any marks on the current page. If so, a screen view is created such that those already-existing marks are displayed overlying the current page in a process step 356. Regardless of whether there are any existing marks on the current page, the system moves to a process step 358 which converts subsequent pen events to marks on the current page. As noted above, these might include notes useful to the user such as times and flight numbers associated with the various airlines as shown in FIG. 20. The marks may be provided in various forms depending upon the pen employed and whether any special functions such as color have been selected.

The system will continue to process pen events in step 358 until the user either selects the mark-up button again or takes another action outside of mark-up mode. This is depicted in FIG. 19 in the loop comprising decision steps 358, 360, and 362. After a pen event has been processed in step 358, decision step 360 determines whether the mark-up button has been reselected. If not, the system moves to decision step 362 which determines whether an outside action (e.g., scrolling, overview button selection, routing slip button selection, etc.) has been taken. Assuming no such action has been taken, process control returns to step 358 where any further pen marks are processed. If decision step 360 ever determines that the mark-up button has been reselected, the marks on the page are hidden in a process step 364. This results in a "clean" (unmarked) page as shown in FIG. 3, and the process is thereafter completed at 365. Also if the decision step 362 determines that an outside action has been taken, the process moves to step 364 where the marks are hidden as mentioned.

Figure 21:
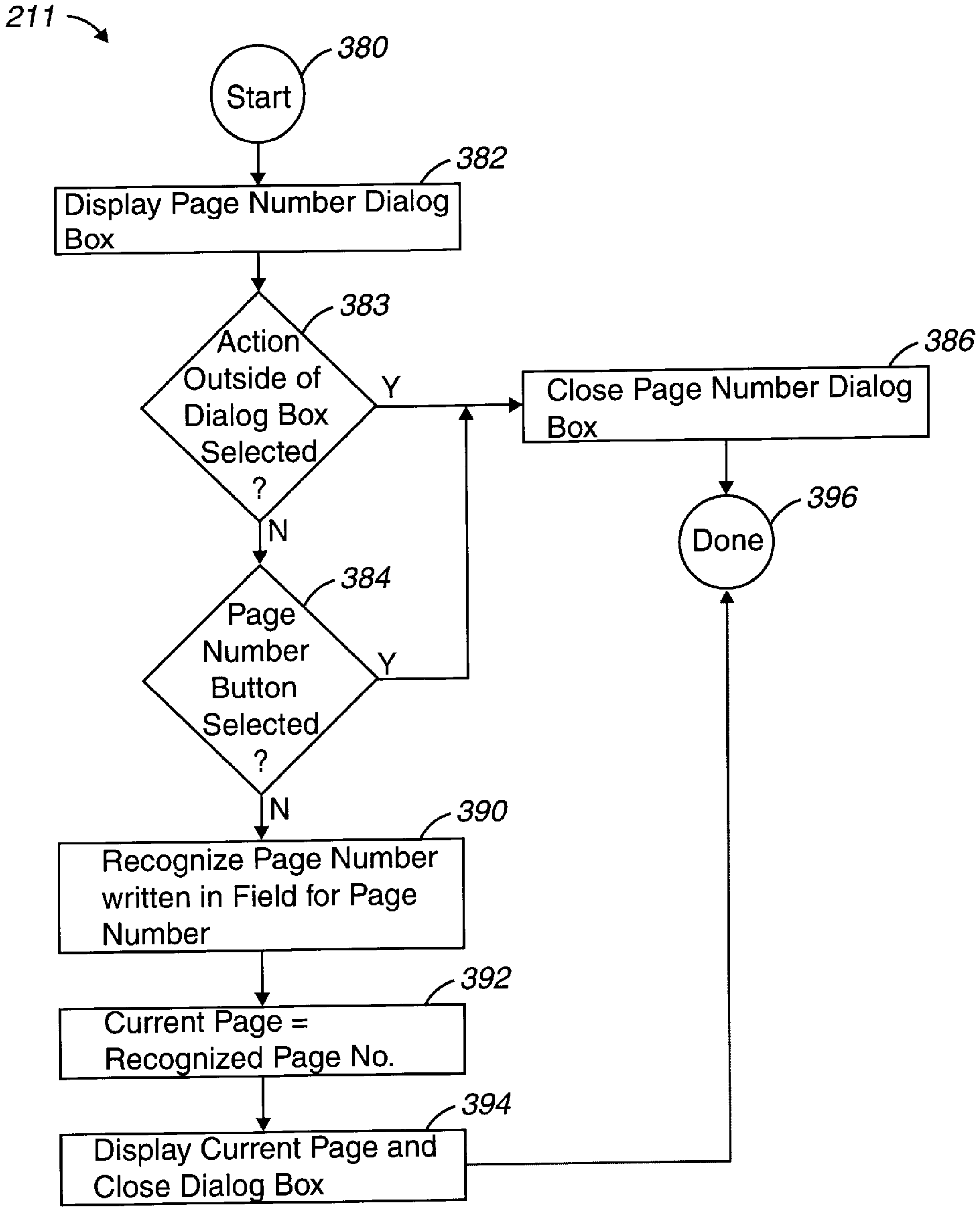
FIG. 21 is a process flow diagram detailing the operation of a page number selection feature of this invention.

FIG. 21 details the procedure resulting when the page number button 84 is selected at decision step 210 of FIG. 10. As noted, this function allows the user to go to a specific page identified by page number. The process begins at 380 and moves to step 382 which displays a page number dialog box 400 (FIG. 22). As with many of the other user-initiated functions described above, the dialog box may be closed and procedure terminated by selecting a close button (402) or selecting an action outside of the dialog box. In this case, these contingencies are represented in decision steps 383 and 384 and process step 386. After the dialog box has been opened in step 382, the process moves decision step 383 which determines whether an action outside the dialog box has been taken. If not, decision step 384 determines whether the page number button has been reselected. If either of steps 383 or 384 is answered in the negative, the process move to step 386 which closes the page number dialog box and terminates the procedure at step 396. As explained in the context of the mark-up button 82, actions outside of the dialog box include, for example, scrolling, routing, etc.

Assuming that the dialog box remains open long enough for a user to write in a page number in field 404 of FIG. 22 (i.e., both decision steps 383 and 384 are answered in the negative), a process step 390 will recognize the page number as written. Various methods and systems for recognizing handwritten input are well-known. Recognizers are discussed in copending U.S. patent application Ser. No. 08/001,123, filed on Jan. 15, 1993, entitled METHOD AND APPARATUS FOR COMPUTERIZED RECOGNITION, and naming Pagallo et al. as inventors and Ser. No. 08/068,443, filed on May 27, 1993, entitled METHOD AND APPARATUS FOR RECOGNIZING HANDWRITTEN WORDS, and naming Beernink as inventor, both of which are incorporated herein by reference for all purposes. After the recognizer has identified the page number written in field 404, a process step 392 sets the current page equal to the recognized page number. Views for the current page are then created and displayed at process step 394. The page number dialog box is also closed and the process is completed at 396.

Figure 23:
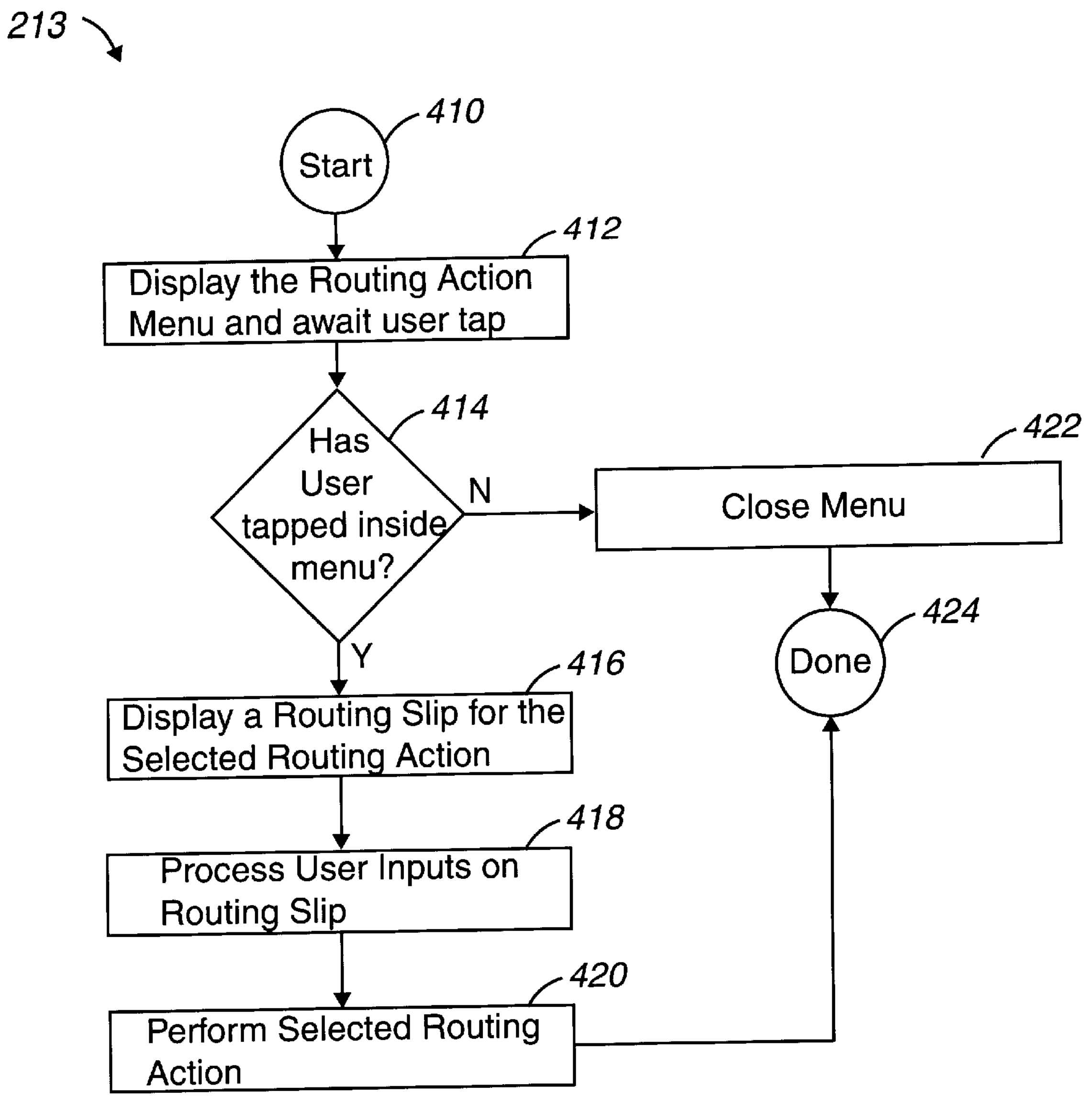
FIG. 23 is a process flow diagram detailing the steps in which a routing action is performed according to the present invention.

FIG. 23 details the routing process of step 213 shown in FIG. 10. The process starts at 410 and proceeds to a process step 412 which displays a routing action menu. The system remains in this state until the user taps the screen 52. At that time, a decision step 414 determines whether the user has tapped inside of or outside of the routing action menu. If the user has tapped inside the menu, a process step 416 displays a routing slip for the selected routing action. The routing slip will typically include various fields for the destination and format of the document to be routed. Further details of routing slips and other aspects of the routing process are described in U.S. patent application Ser. No. 08/130,049, filed on Sep. 30, 1993, naming Poster et al. as inventors, entitled METHOD FOR ROUTING ITEMS WITHIN A COMPUTER SYSTEM, and assigned to the assignee of the present invention. That application is incorporated herein by reference for all purposes. After the routing slip is displayed, any user inputs associated with the routing slip are processed in a step 418. Thereafter, a process step 420 performs the selected routing action, and the process is completed at 424. As noted above, decision step 414 determines whether the user has tapped inside the menu. If he or she has tapped outside of the menu, the menu is automatically closed by a process step 422. The process is then completed at 424.

Figure 24:
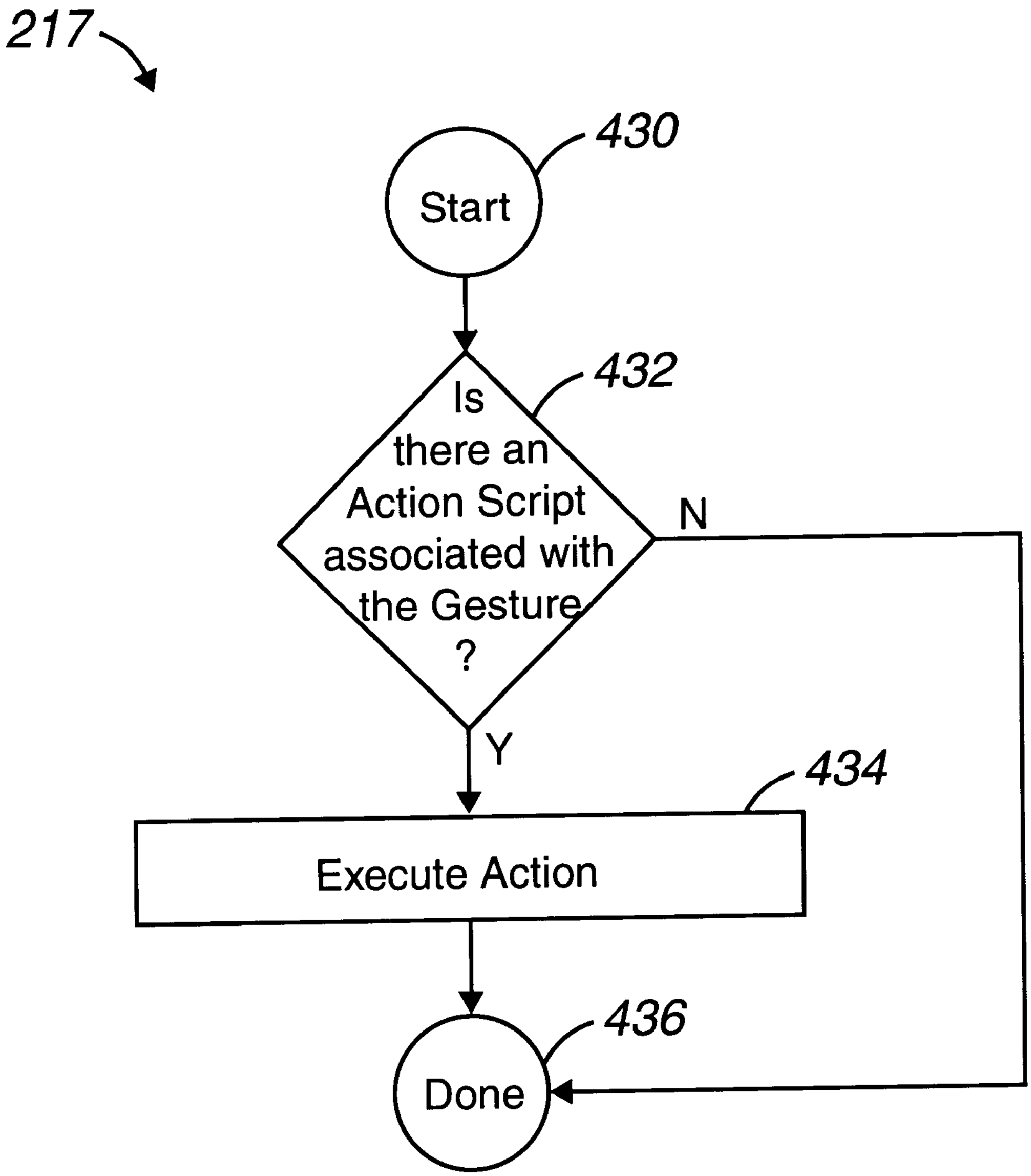
FIG. 24 is a process flow diagram showing the steps employed in processing a live action in accordance with this invention.

FIG. 24 details the steps of processing a gesture as noted at step 217 in FIG. 10. The process starts at 430 and proceeds to a decision step 432 which determines whether there is an action script associated with the gesture that has been received. If so, a step 434 executes that action and the process is completed at 436. If there is no action script associated with the gesture (i.e., decision step 432 is answered in the negative), the process is completed at 436.

As noted above, book authors may include various templates or forms associated with pages of their books. These templates may be activated by the user when he or she selects a button or other "live" feature on display screen 52. The gesture will typically be a simple action such as tapping on a button, but may include other actions such as writing, scrubbing (i.e., deleting an item by scribbling over top of it), and double tapping.

Figure 25:
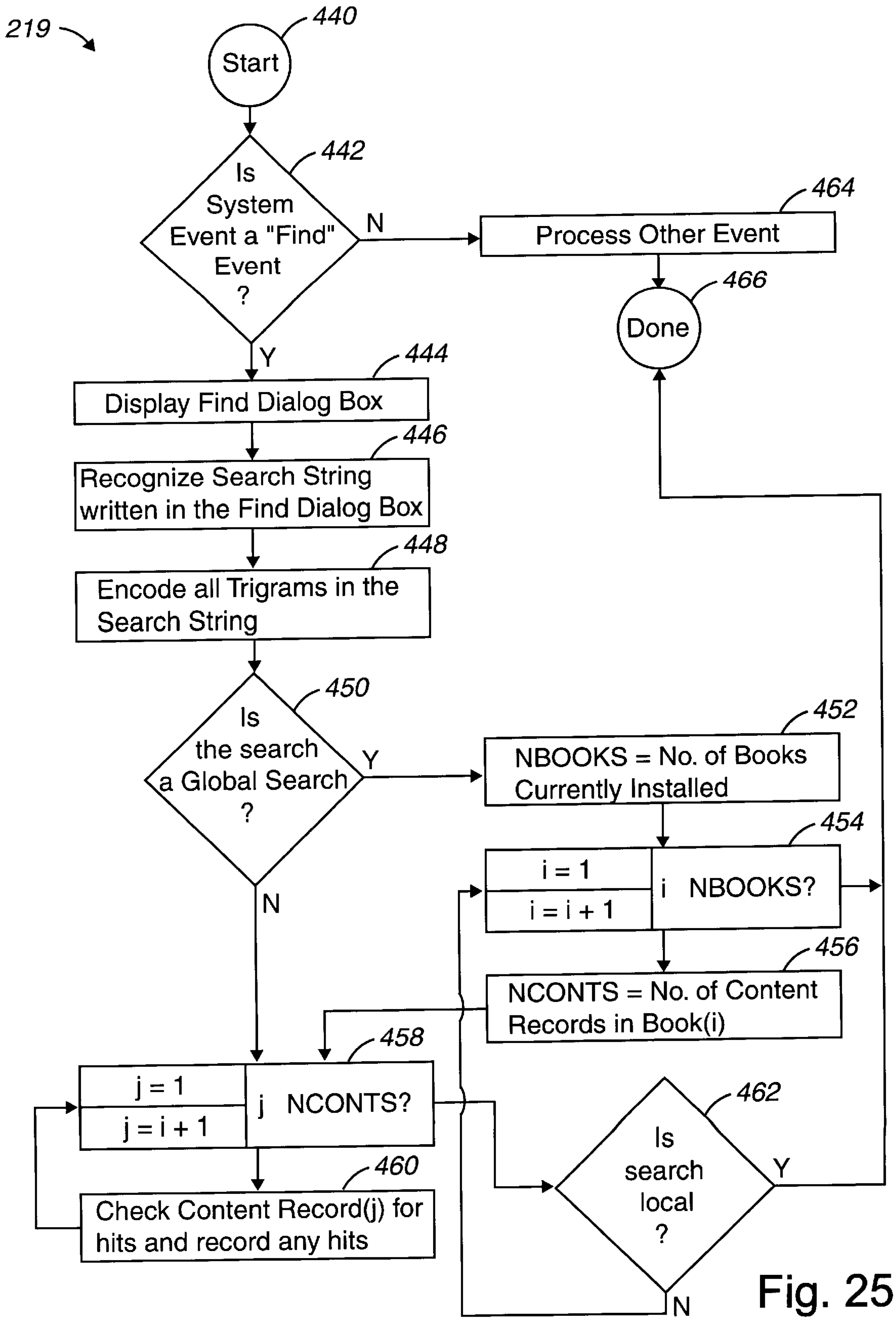
FIG. 25 is a process flow diagram detailing the process of executing a "find" search string request according to this invention.

FIG. 25 details the steps employed to process events at step 219 of FIG. 10. "System events" refer to various events that are prompted from outside of the content engine. These include, for example, intelligent assistance events, find events, etc. As noted above, intelligent assistance routines are described in more detail in U.S. patent application Ser. No. 07/889,225, filed on May 27, 1992, naming Luciw as inventor, and entitled "Deducing User Intent . . . " The present invention employs a particularly efficient "find" process which will be described below.

The process begins at 440 and proceeds to a decision step 442 which determines whether the system event is a "find" event. If not, the process moves to a process step 464 which processes any other events (e.g., an intelligent assistance event). If, however, the system event is a "find" event, a process step 444 displays a "find dialog" box which may have various buttons as noted in U.S. patent application Ser. No. 07/889,660, filed May 27, 1992, naming Capps, et al. as inventor, and entitled "SEARCHING AND DISPLAYING RESULTS IN A PEN-BASED COMPUTER," and U.S. patent application Ser. No. 08/001,121, filed Jan. 5, 1993, naming Capps et al. as inventors, and entitled "LOCATING AND DISPLAYING INFORMATION . . . " Both of these applications are incorporated herein by reference in their entirety for all purposes. The "find dialog" box generally includes a field for the user to write in the search string. When the user has done so, a process step 446 recognizes the search string as text. As noted above, suitable recognizers are well known in the art and described in various patent applications incorporate herein by reference. After the system has recognized the search string, the string is encoded as an array of "trigrams". The details of this procedure will be described below. Briefly, a trigram is a number that represents a sequence of three consecutive letters in a text string. The trigrams for the search string can be compared against trigrams created for certain text contents in the book. By first determining whether the trigrams in the search string are matched by trigrams in the content, the system can determine whether it is worth doing a full search of the content. In this way, a significant number of the potentially searchable text contents can be eliminated from consideration. This significantly improves the efficiency of the search.

After the trigram of the search string has been encoded at step 448, the process moves to a decision step 450 which determines whether the search is a global search. Global searches span all books and, in preferred embodiments, all other records in the system regardless of which application they are associated with. If the search is not a global search, it is deemed a "local" search which is directed to the current book only. If decision step 450 determines that the search is, in fact, a global search, the process proceeds to step 452 which sets the variable NBOOKS equal to the number of books currently available in the system. Next, an iterative loop step 454 initializes a record counter "i" to one and determines whether "i" is less than or equal to NBOOKS. If it is, a process step 456 sets the variable NCONTS equal to the number of contents in the current book being searched, book (i). Next, an iterative loop step 458 initializes a contents counter "j" to one, and determines whether "j" is less than or equal to NCONTS. If it is, a process step 460 checks the content of record (j) for occurrences of the search string and records any such occurrences for use by the find function. Further details of this step will be provided below. Briefly, each content is quickly checked to determine whether it is searchable or not. Obviously, certain contents such as graphics cannot be searched for a text string, and are therefore ignored. Other contents such as text paragraphs may be searchable, and may have trigrams associated with them. Contents having arrays of trigrams, the trigrams of the search string is compared against the trigrams for the text content. If it matches, the full text of that content is then searched for the search string.

After the content of record (j) has been checked in step 460, the process returns to iterative loop step 458 where the content counter j is incremented by one. This process continues until all contents in the current book (book (i)) have been checked by process step 460 and j equals NCONTS. At that point, iterative loop step 458 directs the process to a decision step 462 which checks whether the search is local or global. If it is global, process control returns to iterative loop step 454 where the book counter i is incremented by one, and the next book is thereafter searched as described above. If, on the other hand, the search is a local search, decision step 462 directs process control to 466 and the procedure is completed. In global searches, the loop controlled by iterative loop step 454 continues until all NBOOKS have been checked. Thereafter, the process is complete at step 466.

Figure 26:
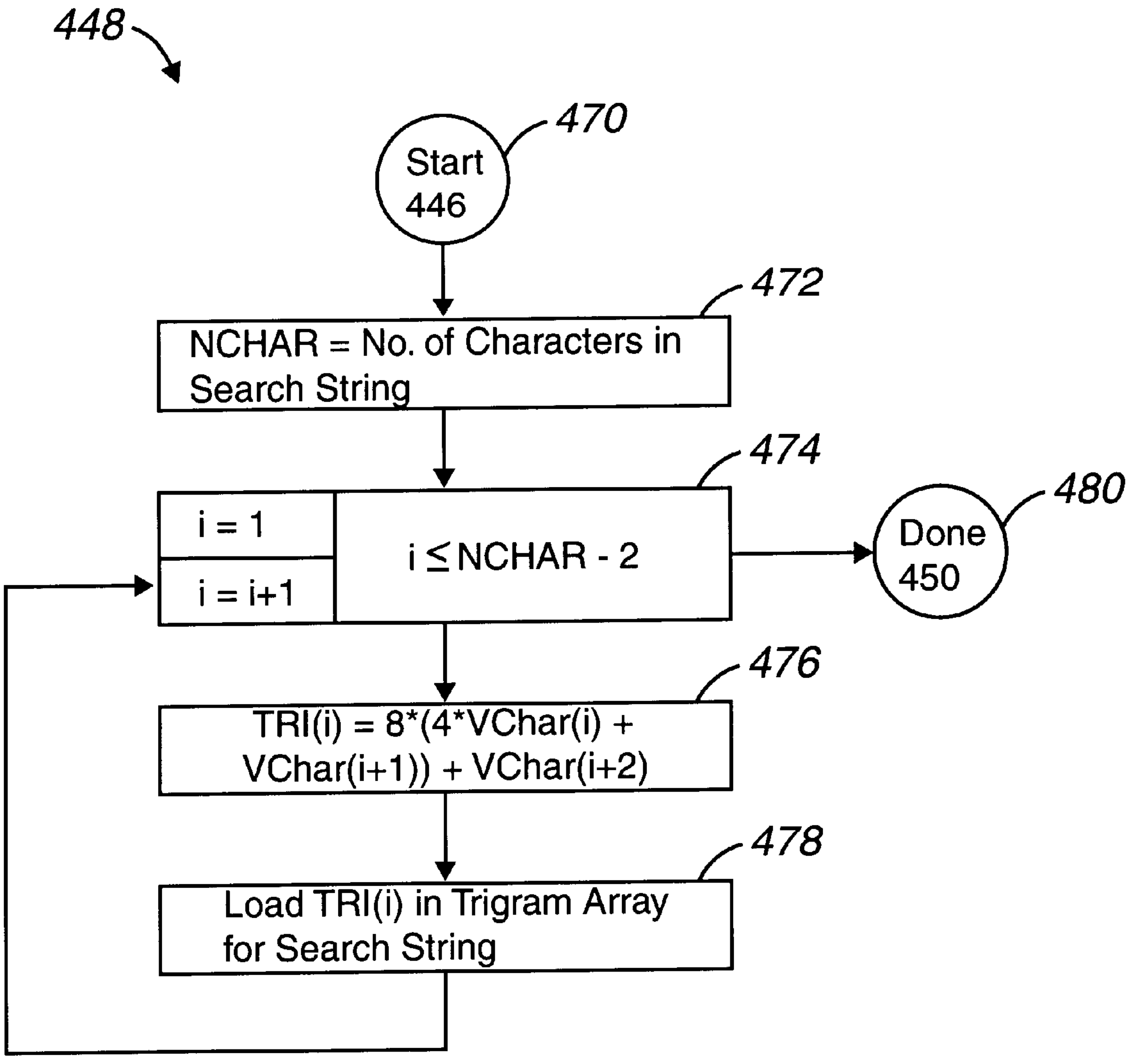
FIG. 26 is a process flow diagram detailing the steps of encoding a search string as a "trigram" array.

FIG. 26 details the procedure by which a search string (or other text string) is encoded as a trigram. Briefly, each text character has an associated numerical value available in a table. For instance, the various ASCII characters will each have an associated, unique numerical value. A trigram is encoded by combining the numerical values for each of three successive characters. The resulting value is not unique for the three successive characters, but it is different from the trigram value for the vast majority of other three letter sequences. Because it is much easier to compare numerical values associated with trigrams than to do a full text search, the search procedure of this invention first compares the search string trigrams against those of the content before doing the full text search.

The process is started at 470 and proceeds to a step 472 which sets the variable NCHAR equal to the number of characters in the search string. Next, an iterative loop step 474 initializes a character counter "i" to one and compares the current value of i to the value NCHAR minus 2. If i is less than or equal to NCHAR minus 2, the process moves to a step 476 which sets the first trigram (TRI(i)) equal to a numerical combination of the numerical character values of each of the three successive characters as shown (i.e., 8*(4*VChar(i)+VChar(i+1))+VChar(i+2)). In binary, this expression can be described as follows: the binary notation of VChar(i) is left shifted by 2 and then summed with the binary notation of VChar(i+1); the resulting sum is left shifted by 3 and then summed with the binary notation of VChar(i+2). The resulting combination of the three values is provided as a binary eight bit trigram which may have a value of between 0 and 255 (in base ten).

Of course other methods of combination are possible, but preferably the chosen method should give an eight bit word. Within this constraint, a number of alternative methods are possible. For example, in some embodiments, the search string is encoded as an NGRAM representing a combination of two, four, five, or some number of character values other than three. In general, NGRAMs comprised of a combination of N characters can be used. However, as the number of characters in an NGRAM increases, the chances that more combinations of characters will give the same value of the NGRAM increases, thus decreasing the reliability of the NGRAM array in predicting whether there will be a hit in a given text content record.

After the numerical values for the individual characters are combined in step 476, a process step 478 loads the value of the trigram in a trigram array being formed for the search string under consideration. The process then returns to iterative loop step 474 where character counter i is incremented by one and compared with the value NCHAR minus 2. Process steps 476 and 478 are repeated for each new character in the search string until the character two characters from the end of the search string is encountered. At that point, each three-character sequence in the search string has been uniquely encoded in a trigram, and iterative loop step 474 directs the process to 480 where the process is completed.

Figure 27:
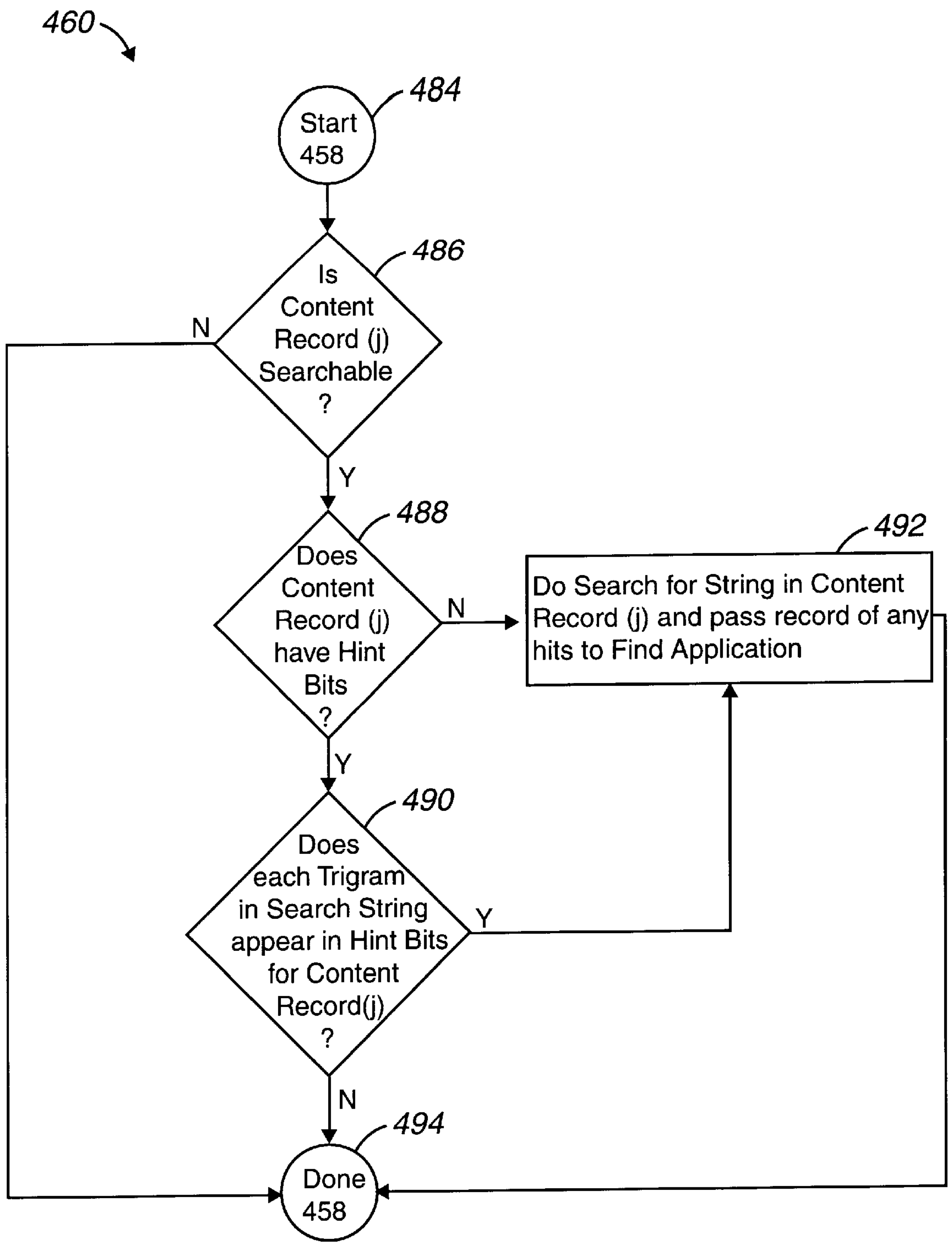
FIG. 27 is a process flow diagram detailing the steps by which a content record is searched for a character string.

The process of checking the content of each record (j) for hits (process step 460 in FIG. 25) is detailed in FIG. 27. Briefly, each content is categorized as one of three types: (1) unsearchable; (2) searchable and without "hint bits"; and (3) searchable and having "hint bits". As noted above, many records such as graphics are unsearchable and can be ignored. Searchable records such as standard text records are either provided with or without hint bits. Hint bits are arrays of trigrams encoding all three character sequences within the content. Certain arbitrarily small content records will contain no hint bits. In a preferred embodiment, records small than about 128 bytes will not contain hint bits. Of course, this cut-off value can be increased or decreased in other embodiments. Generally, the cut-off size can range in length between about 128 and 512 bytes.

The process begins at 484 and proceeds to a decision step 486 which determines whether content record (j) is searchable. If not, the process is completed at 494. That is, record (j) is ignored and the next record is considered (step 458 of FIG. 25). If, on the other hand, decision step 486 determines that record (j) is searchable, a decision step 488 determines whether record (j) contains hint bits. If so, a decision step 490 then determines whether each trigram in the search string appears in the hint bits for content record (j). If not, content record (j) obviously does not contain the search string, and the process is completed at 494. If, on the other hand, each trigram in a search string does, in fact, appear in the hint bits for content record (j), a process step 492 performs a full search of content record (j). If any hits are found, these are recorded and reported to the "find" application. The process is then completed at 494, and the next records is considered according to the above process. If decision step 488 determines that searchable content record (j) does not have hint bits, the process proceeds directly to step 492 where a full search for the search string is conducted in record (j). As before, the process is then completed at 494.

As is apparent from the above discussion, only two types of content records are subject to a full search for the search string: (1) searchable records that do not have hint bits; and (2) searchable records that have hint bits containing matches for each trigram in the search string array. Because many searchable records are automatically ignored (not subjected to a full text search), the process of this invention is considerably more efficient than the case in which a full text search is conducted for each content record.

Figure 28A:
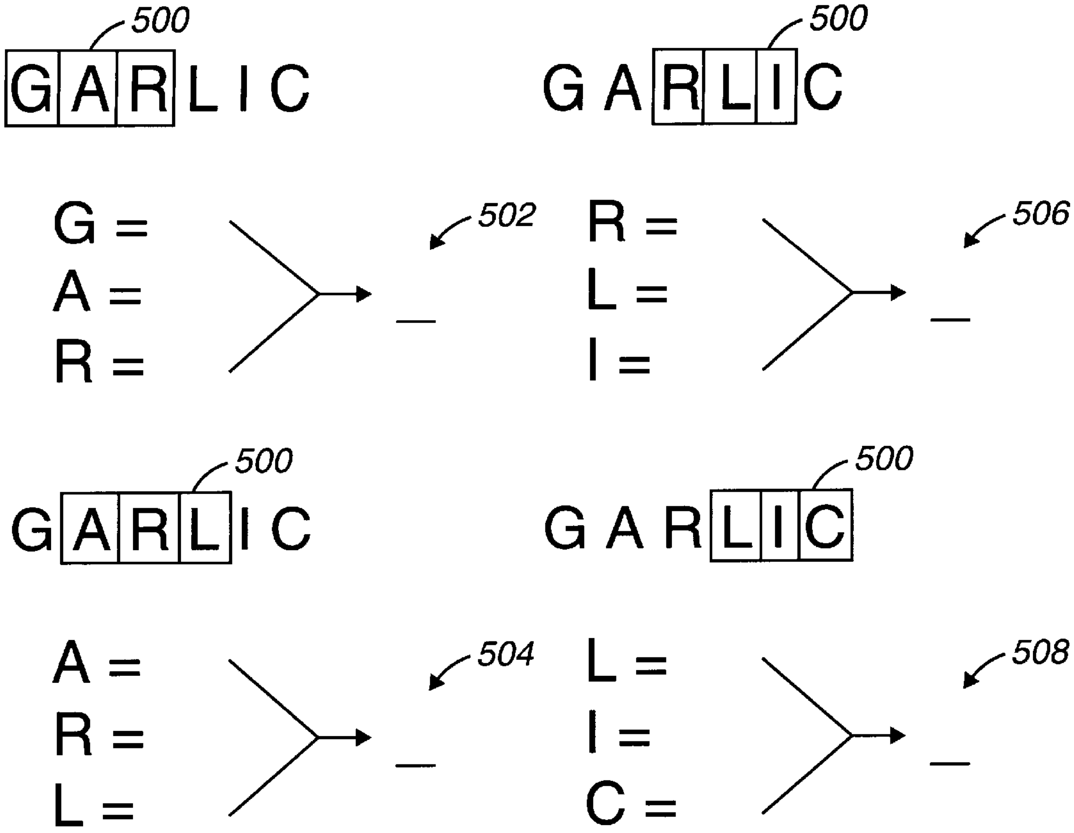
FIGS. 28*a* and 28*b* are illustrations detailing how search strings are encoded as trigrams and used in searches according to the present invention.
Figure 28B:
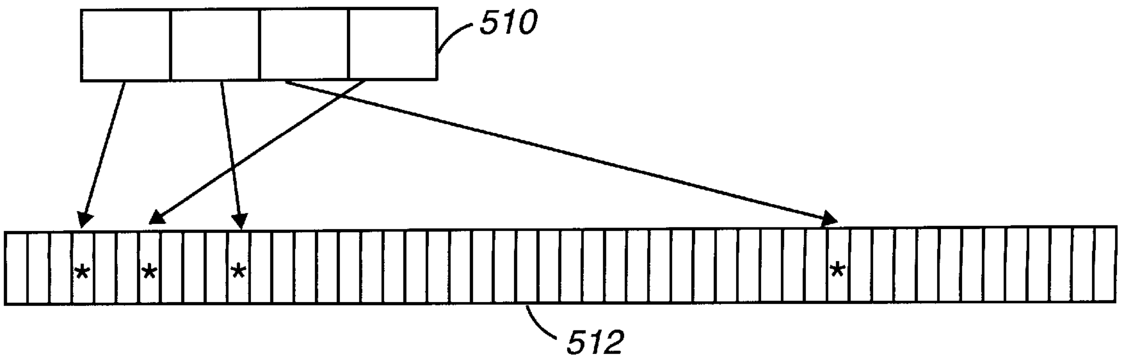

FIGS. 28*a* and 28*b* schematically illustrate the process of encoding a trigram for a search string and comparing the resulting trigrams against hint bits for a content record. As shown in FIG. 28*a,* a three-character frame 500 is moved across a text string (in this case, the word "garlic") to generate the trigram. The first three letters, g, a, r, each have an associated numeric value as shown. In this case, the value for g is 7, the value for a is 1 and the value for r is 18. The distributed sum of these three numeric values gives 250 which is the first entry in the trigram array. The next entry in the trigram array is for the letters a, r, l. As shown, the trigram value for this sequence of characters is 188. The trigram value for the letters r, l, i is 681, and the trigram value for the letters l, i, c is 459. Together, the four values shown at 250, 188, 681, and 459 comprise the trigram array for the text string "garlic". These values are then compared with corresponding bits in a hints bits record.

FIG. 28*b* shows how the trigrams might be used if "garlic" was a search string. The trigram array 510 for garlic is compared against hint bits 512 for a hypothetical text content record. The hint bits are checked for occurrences of each entry in trigram array 510. As indicated by the stars in the hypothetical hint bits in this example, each entry for the garlic trigram would be found in the hint bits. Under these circumstances, a full text search of the content record associated with hint bits 512 would be conducted.

While this invention has been described in terms of several preferred embodiments, it is contemplated that alterations, modifications and permutations thereof will become apparent to those skilled in the art upon a reading of the specification and study of the drawings. Furthermore, certain terminology has been used for the purposes of descriptive clarity, and not to limit of the present invention. For example, the functions provided with the "navigation" or "bookmark" dialog box could be provided within other dialog boxes, on the status bar, or even off the screen as one of the function buttons. It is therefore intended that the following appended claims include all such alterations, modifications and permutations as fall within the true spirit and scope of the present invention.

What is claimed is:

1. A method of processing handwriting written with a pointer on a screen display of a pointer-based computer having a processor connected to the screen display, a memory connected to the processor, a pointer, contents of an electronic book, and one or more buttons, the method comprising:

displaying a view of a current page of the book on the display screen;

recognizing handwriting as one or more character strings when said handwriting is written in handwriting recognition fields displayed on the screen display, the one or more character strings being used to identify at least one location within the book;

displaying handwriting written on the current page of the book after a mark-up button has been selected; and hiding all handwriting and associated text written with said pointer on the current page when the mark-up button is re-selected.

2. The method of claim 1 wherein the handwriting written on the current page is hidden from view when a new current page is selected.

3. The method of claim 1 wherein the handwriting recognition fields include a page number recognition field and wherein the current page is changed to a page having a page number written in the page number recognition field.

4. The method of claim 1 wherein the handwriting recognition fields include a find field and character strings written in said find field are searched in records residing, at least in part, in the memory.

* * * * *